United States Patent
Eto et al.

(10) Patent No.: US 6,742,272 B2
(45) Date of Patent: Jun. 1, 2004

(54) LENS SHAPE MEASURING APPARATUS

(75) Inventors: Yasuhito Eto, Tokyo (JP); Yoshiyuki Hatano, Tokyo (JP); Takeshi Nakamura, Tokyo (JP)

(73) Assignee: Kabushiki Kaisha Topcon, Tokyo (JP)

(*) Notice: Subject to any disclaimer, the term of this patent is extended or adjusted under 35 U.S.C. 154(b) by 0 days.

(21) Appl. No.: 10/066,590

(22) Filed: Feb. 6, 2002

(65) Prior Publication Data

US 2002/0104226 A1 Aug. 8, 2002

(30) Foreign Application Priority Data

Feb. 6, 2001 (JP) .................................. 2001-030279

(51) Int. Cl.$^7$ .................................................. G01B 5/20
(52) U.S. Cl. ............................... 33/507; 33/28; 33/200
(58) Field of Search ............................ 33/28, 200, 507

(56) References Cited

U.S. PATENT DOCUMENTS

| | | | | |
|---|---|---|---|---|
| 4,724,617 A | * | 2/1988 | Logan et al. | 33/28 |
| 5,121,548 A | * | 6/1992 | Daboudet et al. | 33/507 |
| 5,121,550 A | * | 6/1992 | Wood et al. | 33/551 |
| 5,138,770 A | * | 8/1992 | Matsuyama | 33/28 |
| 5,501,017 A | * | 3/1996 | Suzuki | 33/200 |
| 5,594,992 A | * | 1/1997 | Suzuki et al. | 33/200 |
| 5,615,486 A | * | 4/1997 | Igarashi et al. | 33/200 |
| 5,803,793 A | * | 9/1998 | Mizuno et al. | 451/5 |
| 5,895,314 A | * | 4/1999 | Kitao et al. | 451/43 |
| 5,959,199 A | * | 9/1999 | Suzuki et al. | 33/507 |
| 6,006,592 A | * | 12/1999 | Suzuki et al. | 33/507 |
| 6,035,538 A | * | 3/2000 | Miralles Bielsa et al. | 33/200 |
| 6,170,321 B1 | * | 1/2001 | Suzuki et al. | 73/104 |
| 6,263,583 B1 | * | 7/2001 | Mizuno | 33/28 |
| 6,327,790 B1 | * | 12/2001 | Sillon | 33/562 |
| 6,350,190 B1 | * | 2/2002 | Matsuyama | 451/384 |
| 6,409,574 B1 | * | 6/2002 | Shibata | 451/5 |
| 6,625,893 B2 | * | 9/2003 | Suzuki et al. | 33/200 |
| 2002/0026262 A1 | * | 2/2002 | Okada et al. | 700/164 |
| 2002/0026722 A1 | * | 3/2002 | Suzuki et al. | 33/200 |

FOREIGN PATENT DOCUMENTS

| | | |
|---|---|---|
| EP | 0 379 427 | 7/1990 |
| EP | 1 050 372 | 11/2000 |
| JP | 2-190249 | 7/1990 |
| JP | 2000-317796 | 11/2000 |

* cited by examiner

Primary Examiner—Diego Gutierrez
Assistant Examiner—Yaritza Guadalupe
(74) Attorney, Agent, or Firm—Oblon, Spivak, McClelland, Maier & Neustadt, P.C.

(57) ABSTRACT

A lens shape measuring apparatus is disclosed, which is capable of identifying a size of an outer-diameter shape of a lens fixing jig by using a measuring element also used for measuring a lend shape. This lens shape measuring apparatus comprising: a lens fixing jig installed in an eyeglass lens to be processed to clamp the eyeglass lens; a lens rotation shaft for clamping and rotating the lens to be processed; a measuring element abutted on a refracting surface of the lens clamped by the lens rotation shaft; a measuring element position switching mechanism for controlling rotation of the measuring element around a rotation shaft roughly parallel to the lens rotation shaft; and a measuring unit for measuring a moving distance of the measuring element in a direction roughly parallel to the lens rotation shaft. This lens shape measuring apparatus also comprises arithmetic control means for moving a tip of the measuring element relatively in the direction roughly parallel to the lens rotation shaft, measuring a distance from a measuring reference position of the measuring element to an abutting position of the same by the measuring unit, and identifying a shape of the lens fixing jig based on a result of the measurement.

8 Claims, 20 Drawing Sheets

LENS SHAPE MEASURING APPARATUS

BACKGROUND OF THE INVENTION

1. Field of the Invention

The present invention relates to a lens shape measuring apparatus for measuring an edge thickness of an unprocessed eyeglass lens in a position corresponding to lens shape data.

2. Description of the Prior Art

Conventionally, in a lens grinding apparatus, to match axial degrees of an optical center position, an astigmatic axis and the like with one another when a lens to be processed is attached, an adsorption cup, a tape cup using or a double-sided tape or the like has been used.

Such a tape has been used in order to attach and process the lens to be processed in an accurate position. A size of the tape must be as small as possible, because a lens shape (lens frame shape of an eyeglass frame) having a small radius vector can be formed in processing.

However, to hold the lens to be processed against processing resistance of a grinding wheel, it is advantageous to increase not only a force for clamping the lens to be processed but also a diameter of the adsorption cup for fixing the lens to be processed.

Therefore, for outer diameters of a lens fixing jig such as the adsorption cup or the tape cup, a cup receiver installed therein, and a lens pressing portion, large outer diameters (generally about 25 mm) for obtaining a sufficient champing foe with respect to a normal frame size, and small outer diameters (about 16 mm to 20 mm) for dealing with a normally possible smallest frame size, have bee used.

When a fixing jig such as an adsorption cup of a small outer diameter is used, for example as disclosed in Japanese Patent Laid-Open Nos. 1990-190249 (EP 379427 B1), and 2000-317796 (EP1050272 A1), in the recent lens grinding apparatus, since a lens shape such as a frame shape, and a processing size can be identified beforehand, an operator can be advised to use a small fixing jig by displaying a message on a liquid crystal screen or by voice or the like. However, in actual processing, the apparatus itself cannot detect the attachment of the small fixing jig. Consequently, an accident of grinding the lens fixing jig together with the lens to be processed occurred in processing.

Furthermore, in the recent lens grinding apparatus, a position of a V groove formed in a circumferential edge of the eyeglass lens is generally controlled by abutting a measuring element on front and rear refracting surfaces of the eyeglass lens, and tracing the refracting surfaces along a lens shape (frame shape) to measure an edge thickness and a shape of the eyeglass lens, before the eyeglass lens is ground. However, in such measuring of the shape of the eyeglass lens, for example if a large holder was used for the eyeglass lens to be finished in a lens shape (frame shape) of a small outer diameter such as a crab-eye frame, the measuring element measured an outer diameter portion of the lens fixing jig, causing a measuring error and, in some cages, an excessive force was applied to break the measuring element.

SUMMARY OF THE INVENTION

A first object of the present invention is to solve the above-described problem and provide a lens shape measuring apparatus capable of identifying a size of an outer-diameter shape of a lens fixing jig by using a measuring element also used for measuring a lens shape.

A second object of the present invention is to solve the problem and provide a lens shape measuring apparatus capable of identifying a size of an outer-diameter shape of a lens fixing jig in a direction roughly parallel to a lens rotation shaft by using a measuring element also used fox measuring a lens shape.

A third object of the present invention is to solve the above described problem and provide a lens shape measuring apparatus capable of identifying a size of an outer diameter shape of a lens fixing jig in a rotational axial direction of a measuring element roughly parallel to a lens rotation shaft by using the measuring element also used for measuring a lens shape.

In order to achieve the first object, a lens shape measuring apparatus according to a first aspect of the present invention comprises: a lens fixing jig installed in a lens to be processed to clamp the lens; a lens rotation shaft for clamping and rotating the lens to be processed; a measuring element abutted on a refracting surface of the lens clamped by the lens rotation shaft; a measuring unit for measuring a moving distance of the measuring element; and arithmetic control means for identifying a shape of the lens fixing jig based an the moving distance of the measuring element measured by the measuring unit.

In order to achieve the second object, a lens shape measuring apparatus according to a second aspect of the present invention comprises: a lens fixing jig installed in a lens to be processed to clamp the lens; a lens rotation shaft for clamping and rotating the lens to be processed; a measuring element abutted on a refracting surface of the lens clamped by the lens rotation shaft; a measuring unit for measuring a moving distance of the measuring element in a direction roughly parallel to the lens rotation shaft; and arithmetic control means for moving a tip of the measuring element relatively in the direction roughly parallel to the lens rotation shaft; measuring a distance from a measuring reference position of the measuring element to an abutting position of the same by the measuring unit, and identifying a shape of the lens fixing jig based on a result of the measurement.

In order to achieve the third object, a lens shape measuring apparatus according to a third aspect of the present invention comprises: a lens fling jig installed in a lens to be processed to clamp the lens; a lens rotation shaft for clamping and rotating the lens to be processed; a measuring element abutted on a refracting surface of the lens clamped by the lens rotation shaft; measuring element rotating means for controlling rotation of the measuring element around a rotation shaft roughly parallel to the lens rotation shaft; a measuring unit for measuring a moving distance of the measuring element in a direction roughly parallel to the lens rotation shaft; and arithmetic control means for rotating a tip of the measuring element around the lens rotation shaft, and identifying a shape of the lens fixing jig based on a distance of the abutted position of the tip of the measuring element from a measuring element reference position.

BRIEF DESCRIPTION OF DRAWINGS

The above and other objects, features and advantages of the present invention will become more apparent from the following description taken in connection with the accompanying drawings, in which:

FIG. 2A being a perspective view thereof when the cover is open.

FIGS. 3A and 3E show the lens grinding apparatuses according to the embodiment of the present invention; FIG. 3A being a plan view thereof when the cover is closed.

FIG. 4A being an enlarged explanatory view of a first operation panel; and FIG. 4B being a front view of a liquid crystal display.

FIG. 11A being a detailed perspective view of a measuring unit shown in FIG. 5; FIG. 11B being an explanatory view of a position detection sensor of FIG. 11A; and FIGS. 11C and 11D being perspective views of main portions of a feeler of FIG. 11A.

FIG. 12A being a perspective view of FIGS. 11A and 11B seen from a different angle; and FIG. 12B being an explanatory view of the position detection sensor of FIG. 12A.

FIG. 13A being a plan view of the measuring unit of FIG. 11A; and FIG. 13B being an enlarged sectional view of a cover attaching portion to a side wall.

DETAILED DESCRIPTION OF PREFERRED EMBODIMENTS

[Constitution]

Figure 1:
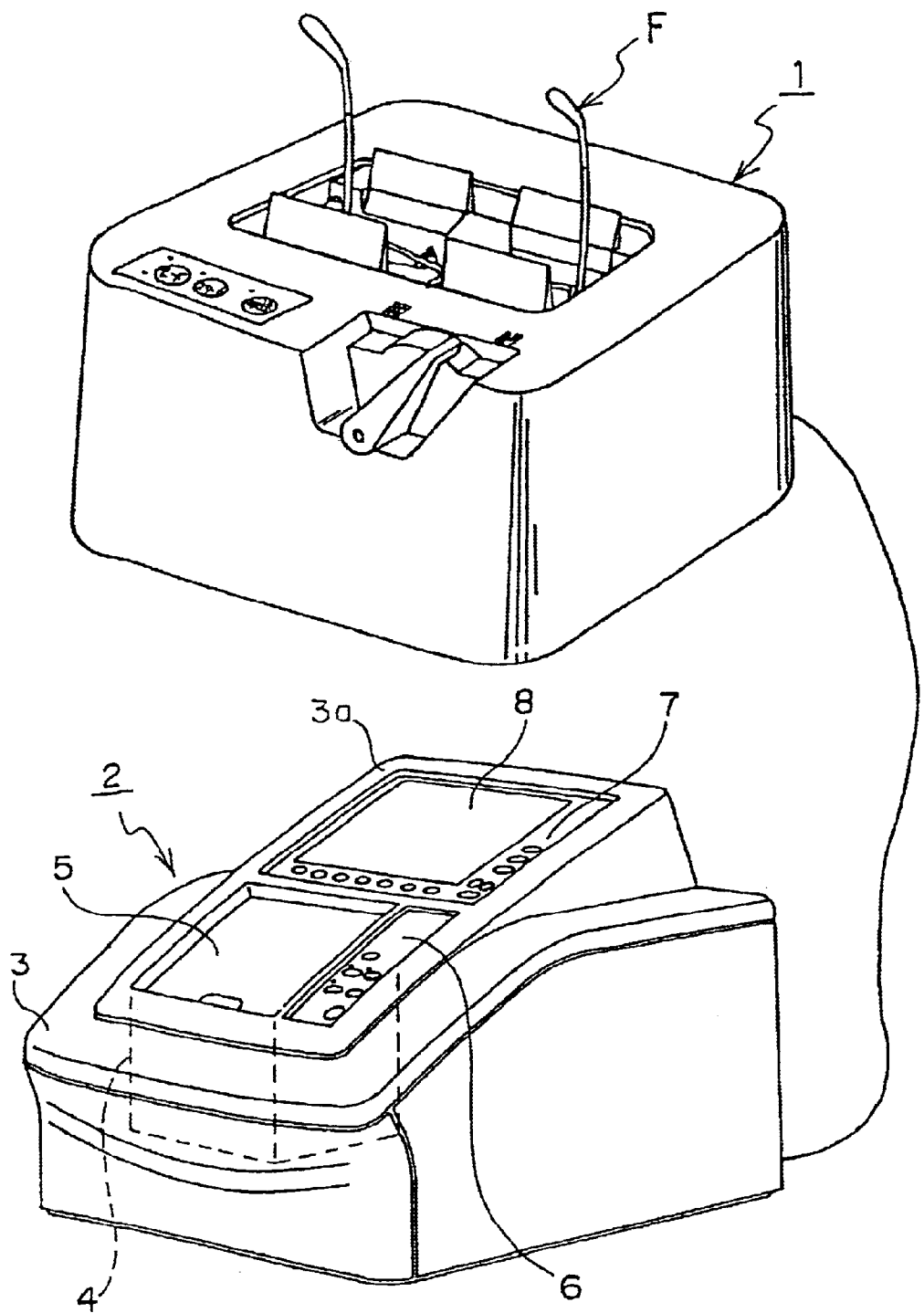
FIG. 1 is an explanatory view showing a relation between a lens grinding apparatus provided with a layout display apparatus according to an embodiment of the present invention and a frame shape measuring apparatus.
Figure 2A:
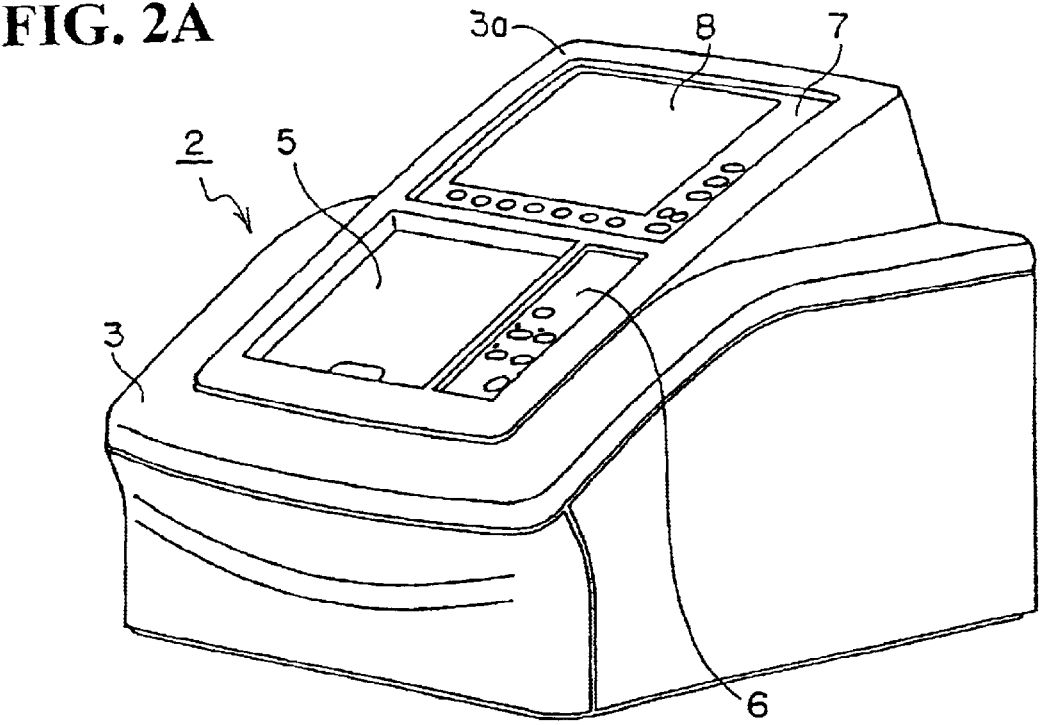
FIGS. 2A and 2B show the lens grinding apparatuses according to the embodiment of the present invention.
Figure 2B:
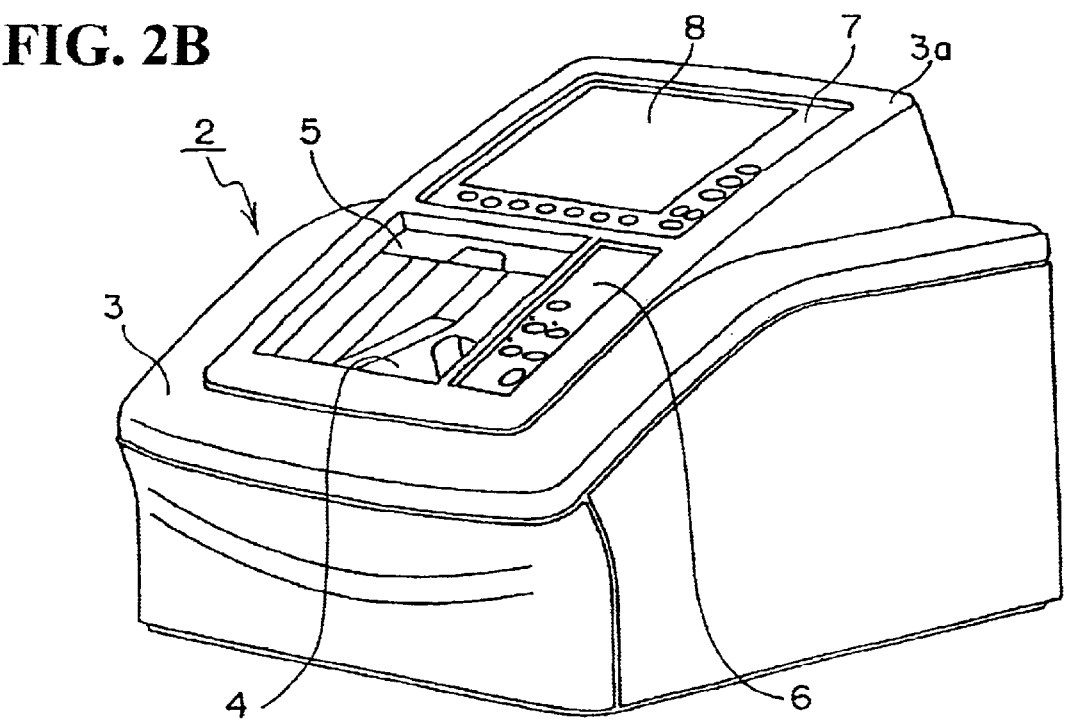

In FIG. 1, reference numeral 1 denotes a frame shape measuring apparatus (lens shape data measuring apparatus), which reads out lens shape information ($\theta i$, $\rho i$) as lens shape data from a lens frame shape of an eyeglass frame F, a template thereof, a lens model, or the like. Reference numeral 2 denotes a lens grinding apparatus (lens grinder), which grinds a natural lens or the like to make an eyeglass lens ML based on the lens shape data of the eyeglass frame inputted by transmission from the frame shape measuring apparatus or the like. A lens grinding apparatus according to the present invention measures a shape of a lens ground by the lens grinding apparatus as described later. Note that a publicly known frame shape measuring apparatus can be used as the frame shape measuring apparatus 1, and explanation of a detailed constitution thereof, data measuring method, or the like will be omitted.

<Lens Grinding Apparatus 2>

As shown in FIGS. 1 to 3B, on an upper portion of the lens grinding apparatus 2, an upper surface (slant surface) 3a slanted downward to the front side of an apparatus unit 3 is provided, and a processing chamber 4 opening at the front side portion (lower portion) of the upper surface 3a is formed. The processing chamber 4 is opened and closed with a cover 5 which is attached to the apparatus unit 3 so as to be obliquely slid up and down.

On the upper surface 3a of the apparatus unit 3, provided are an operation panel 6 positioned on a side of the processing chamber 4; an operation panel 7 positioned behind an upper opening of the processing chamber 4; and a liquid crystal display device 8 positioned behind a lower portion of the operation panel 7, displaying an operation state by the operation panels 6 and 7.

Figure 5:
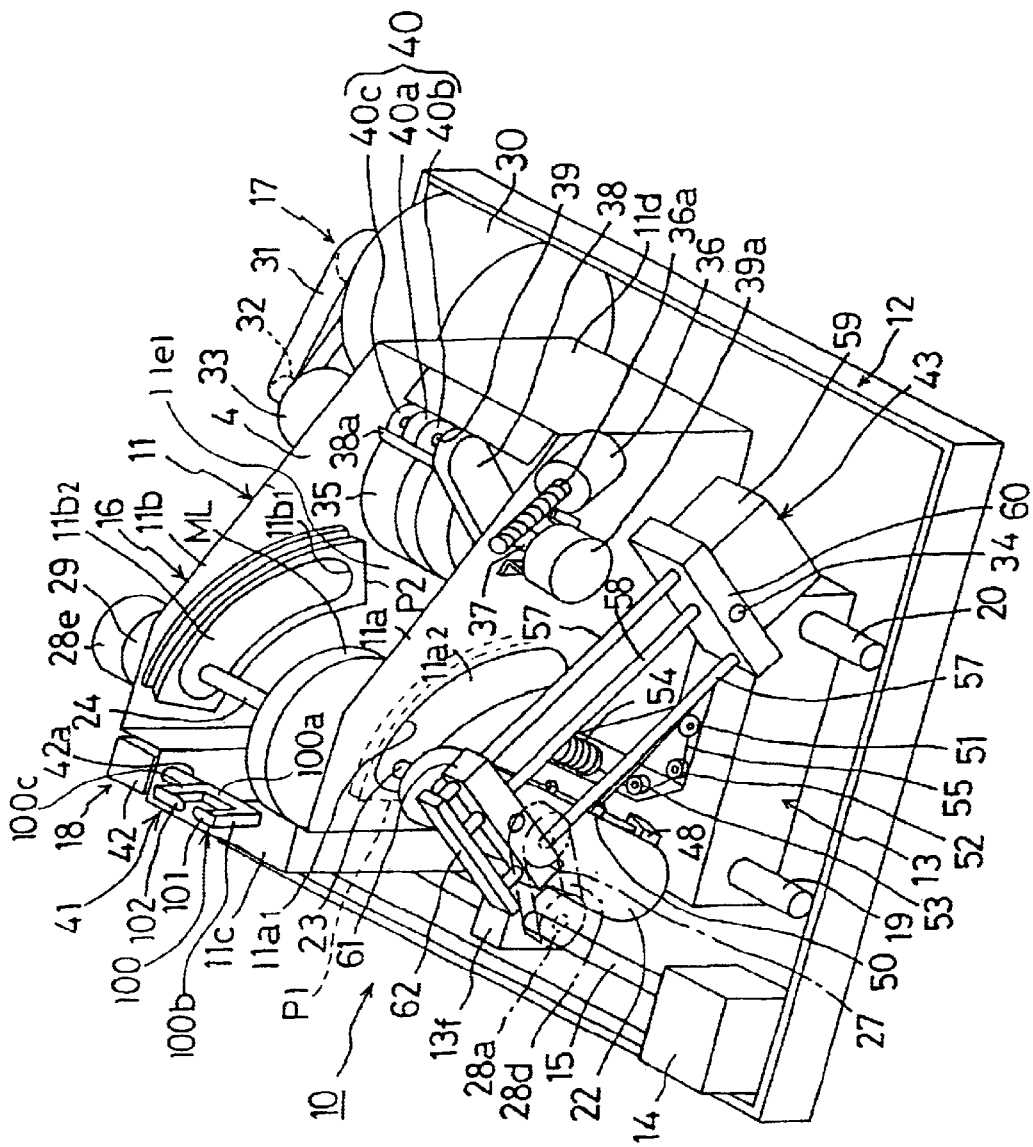
FIG. 5 is a perspective view of a drive system including a lens shape measuring apparatus of the present invention.
Figure 6:
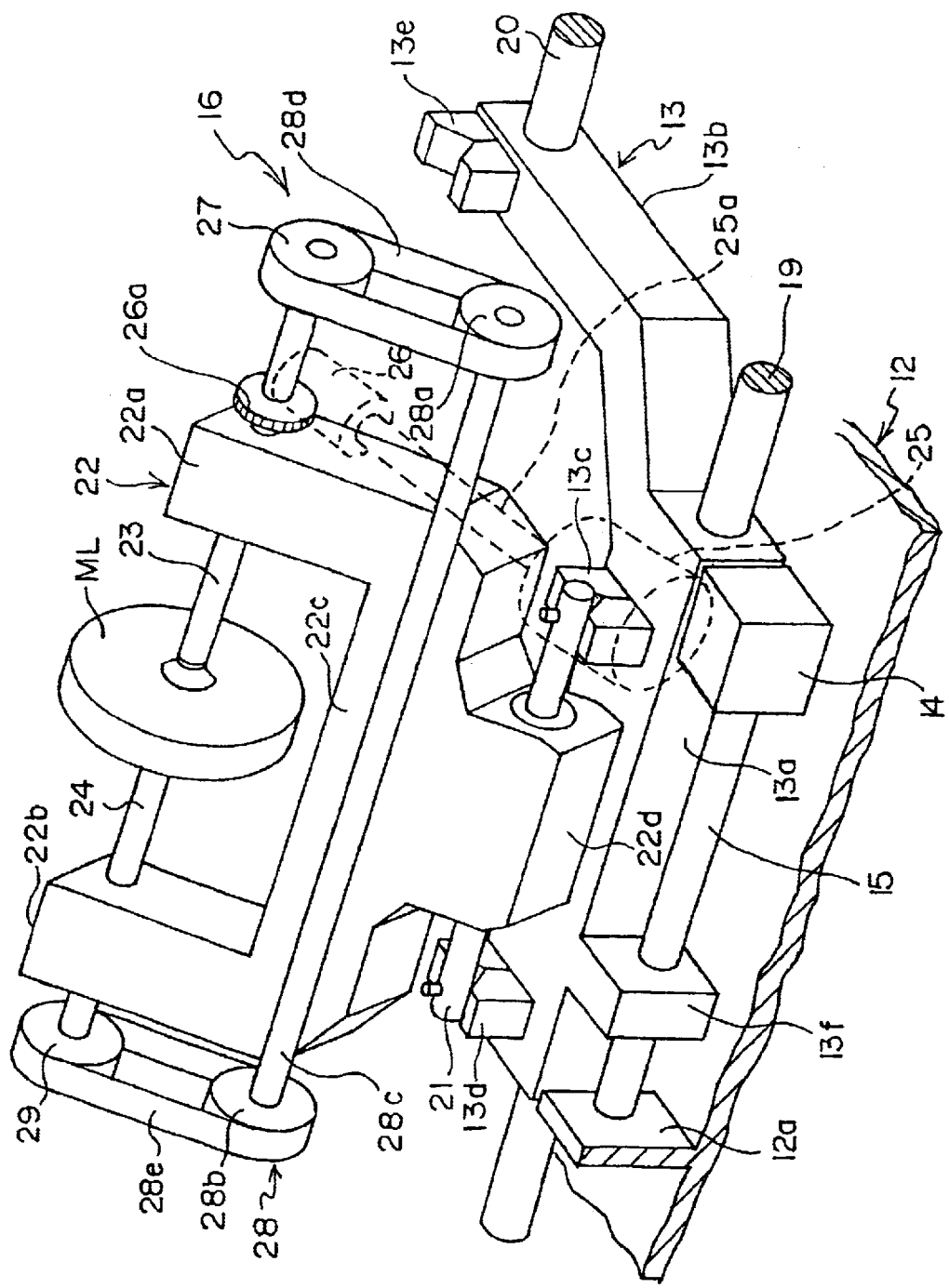
FIG. 6 is a perspective view from behind of a carriage for holding lens shafts, a base, and the like in FIG. 5.
Figure 7:
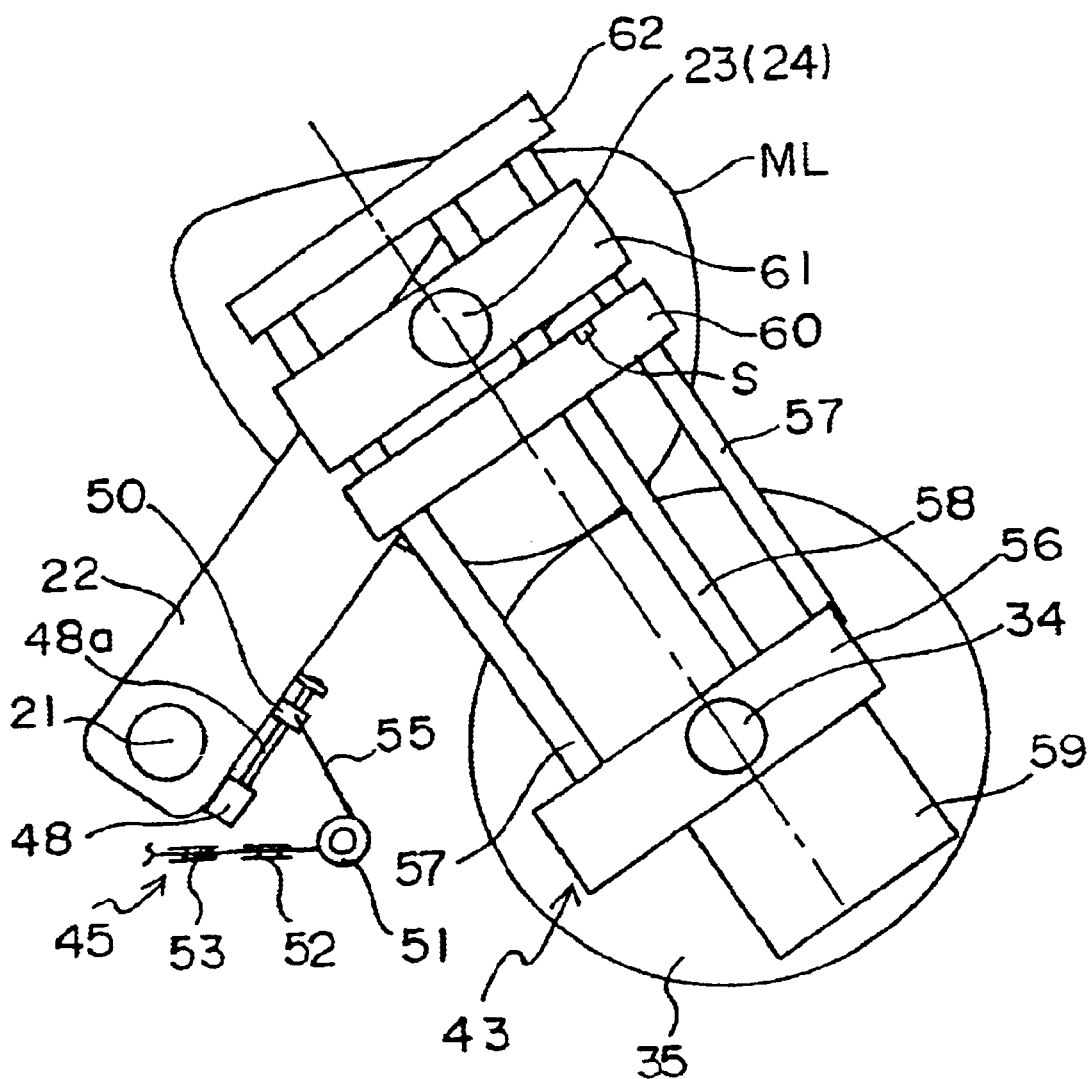
FIG. 7 is a side view showing a processing pressure adjusting mechanism and a shaft-to-shaft distance adjusting mechanism in FIG. 5.

Further, as shown in FIGS. 5 to 7, a grinding portion 10 having the processing chamber 4 is provided in the apparatus unit 8. The processing chamber 4 is formed within a surrounding wall 11 fixed to the grinding portion 10.

The surrounding wall 11 has left and right side walls 11a and 11b, a rear wall 11c, a front wall 11d, and a bottom wall 11e as shown in FIG. 5. In addition, on the side walls 11a and 11b, arc-shaped guide slits 11a1 and 11b1 are formed, respectively (see FIG. 5). As shown in FIG. 5) the bottom wall 11e has: an arc-shaped bottom wall (slanted bottom wall) 11e1 extending downward in arc shape from the rear wall 11c to the front side; and a lower bottom wall 11e2 extending from the front lower end of the arc-shaped bottom wall 11e1 to the front wall 11d. The lower bottom wall 11e2 is provided with a drain 11f in the vicinity of the arc-shaped bottom wall 11e1 and the drain 11f extends to a wastewater tank (not shown) in the lower portion.

(Cover 5)

The cover 5 is composed of one colorless transparent or colored transparent (for example, gray colored transparent) panel made of glass or resin and is slid forward and backward in the apparatus unit 3.

(Operation Panel 6)

As shown in PIG. 4A, the operation panel 6 is provided with a "clamp" switch 6a for clamping the eyeglass lens ML with a pair of lens shafts 23 and 24 to be described later; a "left" switch 6b and a "right" switch 6c for specifying the processing of the eyeglass lens ML for a right eye or a left eye or switching displaying thereof; "move grinding wheel" switches 6d and 6e for moving the grinding wheel in the right and left directions; a "refinish/test" switch 6f for refinishing in the case that a finish grinding of the eyeglass lens MIL is insufficient or for a tentative grinding in the case that the grind is tentatively performed; a "rotate lens" switch 6g for a lens rotation mode; and a "stop" switch 6h for a stop mode.

This is for reducing the burden of work of an operator by disposing such switches necessary for the actual lens processing near the processing chamber 4.

(Operation Panel 7)

Figure 4A:
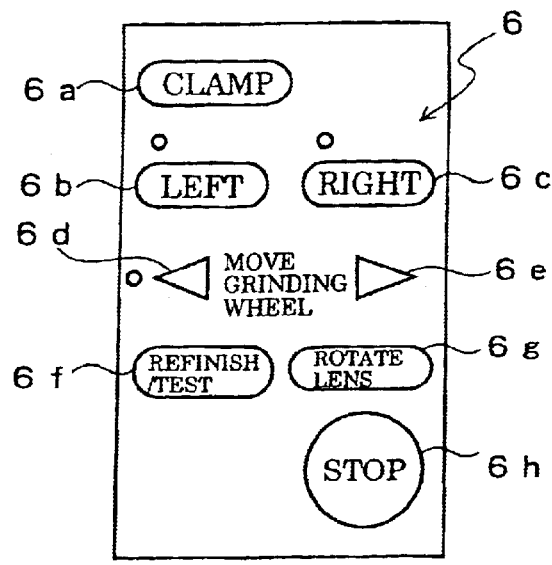
FIGS. 4A and 4B show the lens grinding apparatuses according to the embodiment of the present invention.
Figure 4B:
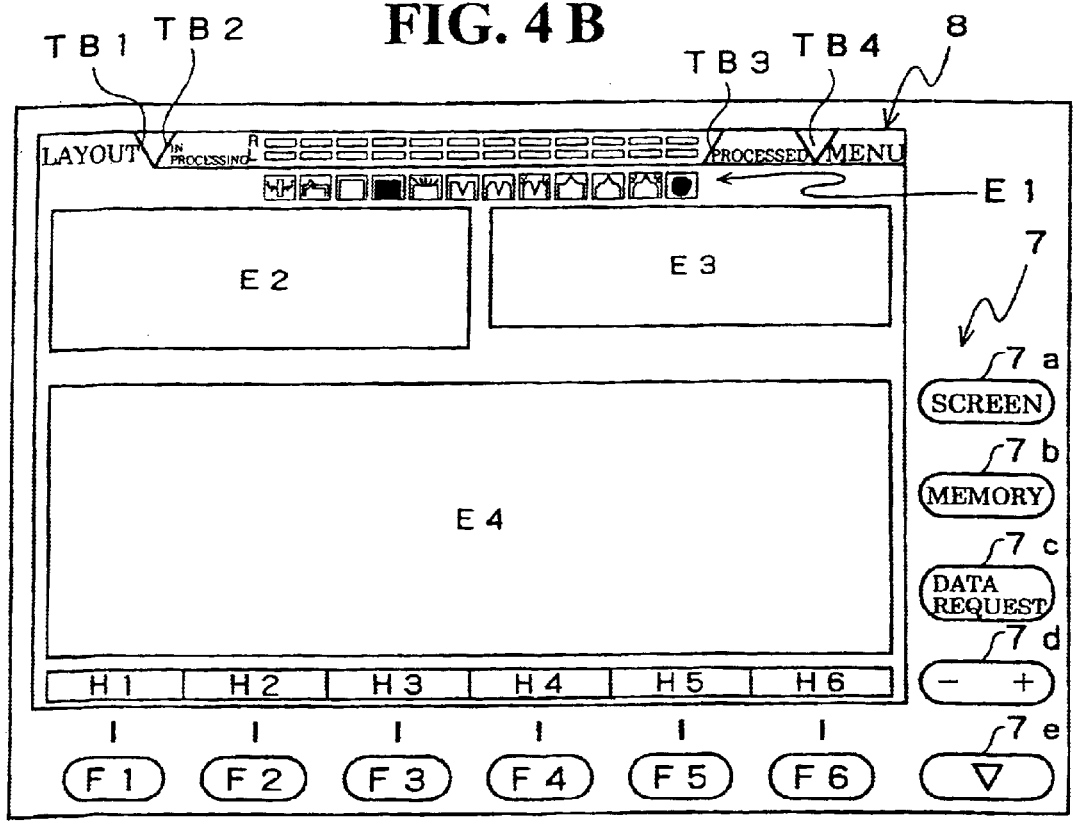

The operation panel 7, as shown in FIG. 4B, has: a "screen" switch 7a for switching a displaying state of the liquid crystal display device 8; a "memory" switch 7b for memorizing settings or the like concerning the grinding displayed an the liquid crystal display device 8; a "data request" switch 7c for fetching out the lens shape information (θi, ρi); a seesaw type "−+" switch for use in a numerical correction or the like (or "−" and "+" switches may be separately provided); and a "V" switch 7e for moving a cursor pointer, which are located at the side of the liquid crystal display device 8. Moreover, function keys F1 to F6 are arranged below the liquid crystal display device 5.

The function keys F1 to F6 are used in case of setting with regard to the grinding of the eyeglass lens ML, as well as are used in response or selection for messages displayed on the liquid crystal display device 8 during the grinding process.

As for the function keys F1 to F6, in the setting with regard to the grinding (layout screen), the function key F1 is used for inputting a kind of lens; the function key F2 for inputting a grinding course; the function key F3 for inputting a lens material; the function key F4 for inputting a kind of frame; the function key F5 for inputting a kind of chamfering; and the function key F6 for inputting a specular working.

As the kinds of lens inputted with the function key F1, "mono-focal", "ophthalmic formula", "progressive", "bi-focal", "cataract", "tsubokuri", and the like are numerated. The "cataract" generally means a plus lens having a high diopter in the eyeglass world, and the "tubokuri" means a concave-like lens and a minus lens having a high diopter.

As the grinding course inputted with the unction key F2, "auto", "test", "monitor", "frame change", and the like are numerated.

As the kinds of material of the lens to be ground, which are inputted with the function key F3, "plastic", "high index", "glass", "polycarbonate", "acrylic", and the like are numerated.

As the kinds of eyeglass frame F inputted with the function key F4, "metal", "cell", "optyl", "flat", "grooving (thin)", "grooving (middle)", "grooving (thick)", and the like are numerated. Each "grooving" indicates a V-groove that is a kind of the V-groove processing.

As the kinds of chamfering inputted with the function key F5, "none", "small", "middle", "large", "special", and the like are numerated.

As the kinds of specular working inputted with the function key F6, "non-execution", "execution", "mirror plane of chamfer portion", and the like are numerated.

Note that modes, types, and an order of the above-described function keys F1 to F6 are not particularly limited. Moreover, for selection of tabs TB1 to TB4 to be described later, function keys for selecting "layout", "in processing", "after processing", "menu" and the like may be further provided, and the number of keys is not limited.

(Liquid Crystal Display Device 8)

In the liquid crystal display device 8, display is changed by a "layout" tab TB1, an "in processing" tab TB2, an "after processing" tab TB3, and a "menu" TB4. The liquid crystal display device 8 has function display sections H1 to H6 corresponding to the function keys F1 to F6 at the lower portion thereof. Note that colors of the tabs TB1 to TB4 are different from each other. In changing the selection of the tabs TB1 to TB4 the color of the background of the display screen other than areas E1 to E4, which will be described later, is changed to the same color as that of the selected tab.

For example, the "layout" tab TB1 and the entire display screen (background) attached with the tab TB1 are displayed in blue; the "in processing" tab TB2 and the entire display screen (background) attached with the tab TB2 in green; the "after processing" tab TB3 and the entire display screen (background) attached with the tab TB3 in red; and the "menu" tab TB4 and the entire display screen (background) attached with the tab TB4 in yellow.

In such a manner, since each of the tabs TB1 to TB4, which are classified for each operation depending on color, and the background of the display screen therewith are displayed in the same color, the operator can easily recognize or confirm the current operation that is being performed.

In the function display sections H1 to H6, necessary objects are properly displayed. In a non-display state, images, numerical values, conditions, or the like different from displays corresponding to the functions of the function keys F1 to F6 can be displayed. Moreover, when each of the function keys F1 to F6 is being operated, display such as a mode display may be changed for each click of the function key F1, for example, during the operation of the function key F1. For example, a list of modes corresponding to the function key F1 may be displayed (pop-up display), whereby the selecting operability can be improved. The list in the pop-up display may be shown with characters, diagrams, icons, or the like.

While the "layout" tab TB1, the "in processing" tab TB2, or the "after processing" tab TB3 are being selected, the display screen is displayed to be sectioned into an ion display area E1, a message display area E2, a numerical value display area E3, and a state display area E4. While the "menu" tab TB4 is being selected, the display screen is displayed as one menu display area as a whole. Note that, while the "layout" tab TB1 is being selected, the "in processing" tab TB2 and the "after processing" tab TB3 are not displayed, and the tab TB2 and the tab TB3 may be displayed at the time when the layout setting is completed.

Since the layout setting by use of the above described liquid crystal display device 8 is similar to that in Japanese Patent Application Nos. 2000-287040 and 2000-290864, detailed description thereof will be omitted.

<Grinding Portion 10>

As shown in FIG. 5, and FIG. 6, the grinding portion 10 comprises: a tray 12 fixed to the apparatus unit 3; a base 13 disposed on the tray 12; a base drive motor 14 fixed to the tray 12; and a screw shaft 15, which has a tip rotatable supported by a support portion 12a and is rotated with an output shaft (not shown) of the base drive motor 14. The support portion 12a is raise from the tray 12 (see FIG. 6). The grinding portion 10 further comprises: a rotation drive system 16 for the eyeglass lens ML; a grinding system 17 for the eyeglass lens ML; and an edge thickness measuring system (edge thickness measuring means) 18 for the eyeglass lens ML, as a driving system.

(Base 13)

The base 13 is formed by a rear support portion 13a extending along a rear edge of the tray 12 in the transverse direction and a side support portion 13b extending from a left end of the rear support portion 13a to the front side, and the base 13, so as to approximately have a V-shape. Shaft support members 13c and 13d, which are V-shaped blocks, are respectively fixed on the right and left end portions of the rear support portion 13a, and a shaft support member 13e, which is a V-shaped block, is fixed on the side support portion 13b.

In the apparatus unit 3, a pair of parallel guide bars 19 and 20 extending in the transverse direction are disposed in parallel on the front and rear side, respectively. The left and right ends of the parallel guide bars 19 and 20 are attached to the left and right portions in the apparatus unit 5. The rear support member 13b of the base 13 is pivotally supported by the parallel guide bars 19 and 20 so as to advance and retract right and left in an axis direction of the guide bars 19 and 20.

Moreover, both ends of a carriage swing shaft 21 extending in the transverse direction are disposed on: V-grooves on the shaft support members 13c and 13d. Referential numeral 22 denotes a carriage attached to the carriage swing shaft 21. The carriage 22 is composed of arm portions 22a and 22b for attachment of shafts, a connecting portion 22c, and a support projecting portion 22d to be formed in a bifurcate shape. The arm portions 22a and 22b are positioned on the left and right sides with an interval therebetween and extended forward and rearward. The connecting portion 22c is extended in the transverse direction and connects the rear ends of the arm portions 22a and 22b. The support projecting portion 22d is provided in the center of the connecting portion 22c in the transverse direction to project rearward. The arm portions 22a and 22b and the connecting portion 22c form a horseshoe. The surrounding wall 11 defining the processing chamber 4 is disposed between the arm portions 22a and 22b.

The carriage swing shaft 21 penetrates the support projecting portion 22d and is held by the support projecting portion 22d, while the carriage swing shaft 21 freely rotates with respect to the shaft support members 13c and 13d. Accordingly, the front end portion of the carriage 22 can swing around the carriage swing shaft 21 up and down. Note that the carriage swing shaft 21 may be fixed to the shaft support portions 13c and 13d, and the support projecting portion 22d may be held by the carriage swing shaft 21 so as to swing with respect to the carriage swing shaft 21 and so as not to move in the axis direction thereof.

The carriage 22 is provided with a pair of the lens shafts (lens rotation shafts) 23 and 24, which extend in the transverse direction and sandwich the eyeglass lens (unprocessed circular eyeglass lens, that is, circular lens to be processed) ML on the same axis. The lens shaft 23 penetrates the tip of the arm portion 22a in the transverse direction, and is held thereon so as to rotate around the axis and so as not to move in the axis direction. The lens shaft 24 penetrates the tip of the arm portion 22b in the transverse direction, and is held thereon so as to rotate around the axis and adjust the movement in the axis direction. Since a well-known structure is employed as such a structure, detailed description will be omitted.

A guide member 13f is integrally formed on the base 13. A screw shaft (feed screw) 15 is screwed in the guide member 13f. The drive motor 14 is operated to drive the screw shaft 15 rotatively, whereby the guide member 13f is advanced and retracted in the axis direction of the screw shaft 15, and then the base 13 is moved along with the guide member 13f. At this time, the base 13 is guided by the pair of the parallel guide bars 19 and 20 to be displaced in the axis direction thereof.

[Carriage 22]

The guide slits 11a1 and 11b1 of the above-described surrounding wall 11 are formed in arc shapes around the carriage swing shaft 21. The opposed ends to each other of the lens shafts 23 and 24, which are held by the carriage 22, ate inserted into the guide slits 11a1 and 11b1. Accordingly, the opposed ends of the lens shaft 23 and 24 are projected into the processing chamber 4 surrounded by the surrounding wall 11.

An arc-shaped guide plate P1 having a hat-shaped section is attached on the inner wall surface of the side wall 11a. As shown in FIG. 5, an arc-shaped guide plate P2 having a hat-shaped section is attached on the inner wall surface of the side wall 11b. In the guide plates P1 and P2, guide slits 11a2' and 11b2' extending in an arc shape are formed so as to correspond to the guide slits 11a1 and 11b1, respectively. A cover plate 11a2 for closing the guide slits 11a1 and 11a2' is disposed between the side wall 11a and the guide plate P1 so as to move forward and rearward and up and down. A cover plate 11b2 for closing the guide slits 11b1 and 11b2' is disposed between the side wall 11b and the guide plate P2 so as to move forward and rearward and up and down. Moreover, the lens shafts 23 and 24 slidably penetrate the cover plates 11a2 and 11b2, respectively. Thus, the cover plates 11a2 and 11b2 are attached to the lens hafts 23 and 24 so as to move relatively in the axis direction, respectively.

In addition, in the guide plate P1, arc-shaped guide rails Ga and Gb are provided, which are positioned above and below the guide slits 11a1 and 11a2' along the upper and lower edges of the guide slits 11a1 and 11a2'. The guide plate P2 is provided with arc-shaped guide rails Gc and Gd respectively positioning above and below the side slits 11b1 and 11b2' to follow the upper and lower axes of the guide slits 11b1 and 11b2'. The cover plate 11a2 can be guided in the guide rails Ga and Gb at the upper and lower edges thereof to move up and down while drawing an arc. The cover plate 11b2 can be guided in the guide rails Gc and Gd at the upper and lower edges thereof to move up and down while drawing an arc.

The lens shaft 23 of the carriage 22 slidably penetrates the arc-shaped cover plate 11a2, thus facilitating assemblies of the lens shaft 23, the side wall 11a, the guide plate P1, and the cover plate 11a2. The lens shaft 24 of the carriage 22 slidably penetrates the arc-shaped cover plate 11b2, thus facilitating assemblies of the lens shaft 24, the side wall 11b, the guide plate P2, and the cover plate 11b2.

Moreover, a space between the cover plate 11a2 and the lens shaft 23 is sealed by seal members Sa and Sa, and the cover plate 11a2 is held by the lens shaft 23 via the seal members Sa and Sa. A space between the cover plate 11a2 and the lens shaft 24 is sealed by seal members Sb and Sb, and the cover plate 11b2 is held by the lens shaft 24 via the seal members Sb and Sb so as to relatively move in the axis direction. Accordingly, when the lens shafts 23 and 24 rotate along the guide slits 11a1 and 11b1 while drawing an arc, the cover plates 11a2 and 11b2 can also move up and down together with the lens shafts 23 and 24, respectively. The seal members Sa and Sa may be held by the cover plate 11a2, or the circumferential parts thereof may be disposed between the cover plate 11a2 and the side wall 11a and between the cover plate 11a2 and the guide plate P1 so that the seal members Sa and Sa cannot move in the axis direction of the lens shaft 23 when the lens shaft 23 moves in the axis direction. Similarly, the seal members Sb and Sb may be held by the cover plate 11a2, or the circumferential parts thereof may be disposed between the cover plate 11b2 and the side wall 11b and between the cover plate 11b2 and the guide plate P2 so that the seal members Sb and Sb cannot move in the axis direction of the lens shaft 24 when the lens shaft 24 moves in the axis direction.

The side wall 11a and the guide plate P1 are close to the arc-shaped cover plate 11a2 so as to contact thereto tightly, and the side wall 11b and the guide plate P2 are close to the arc-shaped corer plate 11a2 so as to contact thereto tightly.

Each of the guide plates P1 and P2 in the processing chamber 4 is provided to extend to the vicinities of the rear wall 11c and the lower bottom wall 11e2 and is designed to have the upper end cut on the side of a feeler 41 and the lower end cut in the upper vicinity of a grinding wheel 35, whereby the upper and lower ends of the guide plates P1 and p2 are opened within the processing charmer 4. Accordingly, the grinding fluid is flown along the inner surfaces of the side walls 11a and 11b; so that the grinding fluid does not stay between the side wall 11a and the guide plate P1 and between the side wall 11b and the guide plate P2.

When the carriage 22 is swung up and down around the carriage swing shaft 21 and the lens shafts 23 and 24 are moved up and down along the guide slits 11a1 and 11b1 the cover plates 11a2 and 11b2 are moved up and down together with the lens shafts 23 and 24. Accordingly, the guide slits 11a1 and 11b1 are always closed by the cover plates 11a2 and 11a2, and then the grinding fluid or the like within the surrounding wall 11 does not leak to the outside of the surrounding wall 11. Note that the eyeglass lens ML is close to or apart from the grinding wheel with the upward and downward movement of the lens shaft 23 and 24.

At the time of loading of the raw lens of the eyeglass lens ML or the like to the lens shafts 23 and 24 and unloading thereof after the grinding, the carriage 22 is positioned in the center of the swinging in the vertical direction such that the lens shafts 23 and 24 are positioned in the middle of the guide slits 11a1 and 11b1, respectively. At the time of measuring the edge thickness and the grinding, the carriage 22 is controlled and swung upward and downward to be slant in accordance with a grinding amount of the eyeglass lens ML.

(Rotation Drove System 16 for Lens Shafts 23 and 24)

Figure 8:
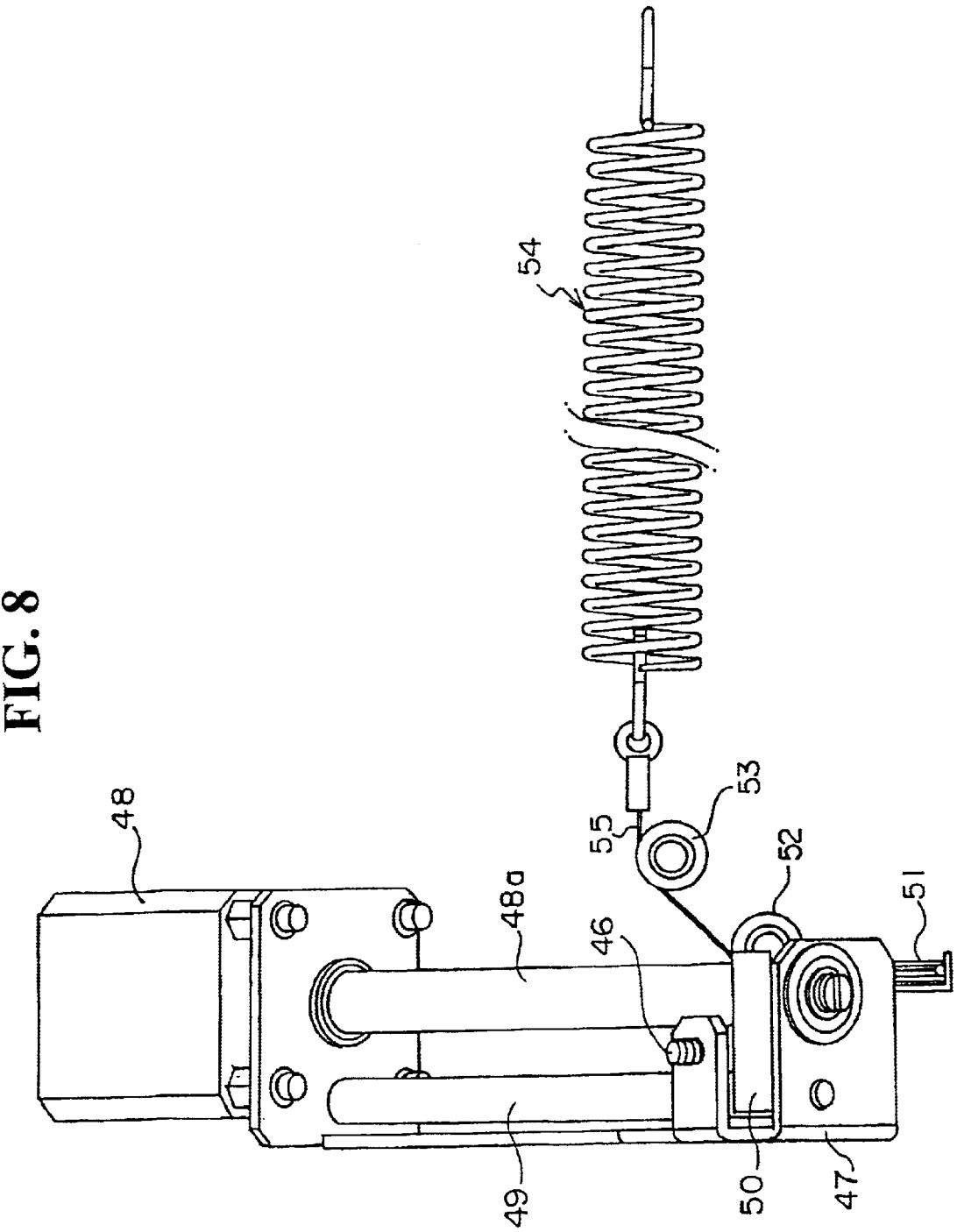
FIG. 8 is am explanatory view of the processing pressure a adjusting mechanism in FIG. 5.

The rotation drive system 16 for lens shafts 23 and 24 has a lens shaft drive motor 25 fixed to the carriage 22 by not-shown fixing means; a power transmission shaft (drive shaft) 25a, which is rotatably held by the carriage 22 and is linked with an output shaft of the lens shaft drive motor 25; a drive gear 26 provided on the tip of the power transmission shaft 25a; and a driven gear 26a geared with the drive gear 26 and attached to one lens shaft 23. In FIG. 8, as the drive gear 26, a worm gear is employed, and as the driven gear 26a, a worm wheel is employed. Note that, as the drive gear 26 and the driven gear 26a, a bevel gear can be employed.

The rotation drive system 16 further comprises a pulley 27 fixed to the outer end (opposite end to the lens shaft 24) of one lens shaft 23; a power transmission mechanism 28 provided for the carriage 22; and a pulley 29 rotatably held on the outer end (opposite end to the lens shaft 23) of the other lens shaft 24. The pulley 29 is provided so as to relatively move against the lens shaft 24 in the axis direction thereof. Moreover, when the lens shaft 24 is adjusted to move in the axis direction, the movement of the pulley 29 is controlled by a not-shown movement control member or the like provided with the carriage 22 such that the position of the pulley 29 is not changed in the axis direction.

The power transmission mechanism 28 has transmission pulleys 28a and 28b; and a transmission shaft (power transmission shaft) 28c having the transmission pulleys 28a and 28b fixed on both ends thereof. The transmission shaft 28c is disposed parallel to the lens shafts 23 and 24 and rotatably held by the carriage 22 with a not-shown bearing. The power transmission mechanism 28 further comprises a driving side belt 28d bridged between the pulley 27 and the transmission pulley 28a; and a driven side belt 28e bridged between the pulley 29 and the transmission pulley 28b.

When the lens drive motor 25 is operated to rotate the power transmission shaft 25a, the rotation of the power transmission shaft 26a is transmitted via the drive gear 26 and the driven gear 26a to the lens shaft 23, so that the lens shaft 23 and the pulley 27 are rotatively driven together. Meanwhile, the rotation of the pulley 27 is transmitted via the drive side belt 28d, the transmission pulley 28a, the transmission shaft 28c, the transmission pulley 28b, and the driven side belt 28e to the pulley 29, and then the pulley 29 and the lens shaft 24 are rotatively driven integrally. At this time, the lens shaft 24 and the lens shaft 23 are integrally rotated in synchronization with each other.

(Grinding System 17)

The grinding system 17 includes a grinding wheel drive motor 30 fixed to the tray 12; a transmission shaft 32 to which drive of the grinding wheel drive motor 30 is transmitted via a belt 31; a grinding wheel shaft 33 to which rotation of the transmission shaft 32 is transmitted; and the grinding wheel 35 fixed to the grinding wheel shaft 33. The grinding wheel 35 includes a rough grinding wheel, a grinding wheel for a V-groove, a finish grinding wheel, or the like, of which reference numerals are omitted. The rough grinding wheel, the grinding wheel for the V-groove and the finish grinding wheel are disposed side by side in the axis direction.

The grinding system 17 further includes a swing arm drive motor 36 fixed to the apparatus unit 3; a worm gear 36a fixed to the output shaft of the swing arm drive motor 36; a tubular shaft-shaped worm 37 rotatably held by the surrounding wall 11; a hollow swing arm 38 integrally fixed to the worm 37; a rotation shaft 39 having one end rotatably held by a free end of the swing arm 38 and projecting from the bee end to the right direction in FIG. 5; and a grinding wheel 40 for grooving fixed to the rotation shaft 39.

The grinding system 17 further includes a drive motor 39a attached to the surrounding wall 11 and of which a not-shown output shaft is inserted into the tubular worm shaft 37; and a power transmission mechanism disposed within the swing arm 38 to transmit rotation of the output shaft of the dive motor 39a to the rotation shaft 39.

As shown in FIG. 5, the grinding wheel 40 for grooving includes chamfering grinding wheels 40a and 40b for processing a chamfer on the periphery of the eyeglass lens ML; and a grooving cutter 40c attached to the rotation shaft 29 adjacent to the chamfering grinding wheel 40a. Moreover, at arc-shaped cover 38a is attached to the swing arm 38. The arc-shaped cover 38a covers lower portions of the chamfering grinding wheels 40a and 40b and the grooving cutter 40c.

<Pressure Adjusting Mechanism 45>

In the vicinity of the carriage swing shaft 21 of the carriage 22, a pressure adjusting mechanism 45 is provided for adjusting a press-contact amount of the eyeglass lens ML to the grinding wheel 35.

As shown in FIG. 8, the pressure adjusting mechanism 45 includes: a bracket 47 fixed to the carriage 22 with a screw 46; a mover displacement motor 48 fixed to the bracket 47; a screw shaft 48a rotating with a not-shown output shaft of the mover displacement motor 48; and a mover 50 geared with the screw shaft 48a (see FIG. 7). The tip of the screw shaft 48a is rotatably held by the bracket 47, and the mover 50 is guided by a guide rail 49 parallel to the screw shaft 48a in the axis direction.

Moreover, the pressure adjusting mechanism 45 further includes three pulleys 51, 52 and 58 rotatably held by the base 13; and a pull cord 55 having both ends held by the mover 50 and a spring 54. The pull cord 55 is changed the direction thereof by the pulleys 51, 62 and 53 so as to pull the mover 50 in the direction approximately orthogonal to the guide rail 49 with pull strength of the spring 54. The other end of the spring 54 is fixed to the base 13.

The pressure adjusting mechanism 45 utilizes a following mechanism. The distance between the mover 50 and the carriage swing shaft 21 is changed in accordance with a position of the mover 50 on the guide rail 49, and an energizing force caused by the pull strength of the spring 54 at the tip of the carriage 22, that is, an energizing pressure to the grinding wheel 35 by the eyeglass lens ML, which is sandwiched by the lens shafts 23 and 24, is thereby changed in accordance with the distance. Note that the screw shaft 48a and the guide rail 49 are approximately orthogonal to the lens shaft 23 and the carriage swing shaft 21.

Accordingly, as for the contact state of the eyeglass lens ML with the grinding wheel 35, while the pull strength of the spring 54 is approximately constant, a contact force per unit area can be adjusted by changing the position of the mover 50 on the guide rail 49 in accordance with variation of the processing condition, such as a dislocation of the contact from the pressurized direction, a difference in the contact area in accordance with a variation in the shape of the eyeglass lens ML, and a difference in the edge thickness in accordance with the lens diopter.

As described above, since the carriage 22 is slant downward from the intermediate position in accordance with a grinding amount of the eyeglass lens ML, it is a matter of course that the pressure adjusting mechanism 45 is positioned on a lower side of the slant carriage 22. Since the carriage 22 is slant, an operating force corresponding to the energizing force at the tip of the carriage 22 can be changed by using the mover 50 as a mere weight, even when the pulleys 51, 52, and 53, the spring 54, and the pull card 55 are removed. Accordingly, abutment pressure by the eyeglass lens ML to the grinding wheel 35 can be adjusted in accordance with the position of the mover 50 on the guide rail 49.

<Shaft-to-Shaft Distance Adjusting Means 43>

As shown in FIG. 7, the distance between the lens shafts 23 and 24 and the grinding wheel shaft 33 is adjusted by shaft-to-shaft distance adjusting means (shaft-to-shaft distance adjusting mechanism) 43.

The shaft-to-shaft distance adjusting means 43 includes a rotation shaft 34 having an axis positioned on the same axis of the grinding wheel shaft 33 as shown in FIG. 7. The rotation shaft 34 is rotatably supported on the V-groove of the projecting support member 13e in FIG. 6.

The shaft-to-shaft distance adjusting means 43 includes a base board 56 held by the rotation shaft 34; a pair of parallel guide rails 57 and 57 attached to the base board 56 and obliquely extended upward from the upper surface thereof; a screw shaft (feed screw) 58 rotatably provided on the base board 56 to be parallel to the guide rails 57 and 57; a pulse motor 59 provided on the lower surface of the base board 56 for rotating the screw shaft 58; and a stage 60 brewed by the screw shaft 58 and held by the guide rails 57 and 57 to move up and down (omitted in FIG. 5 for convenience of illustrating other portions).

The shaft-to-shaft distance adjusting means 43 farther includes a lens shaft holder 61 disposed above the stage 60 and held by the guide rails 57 and 57 so as to move up and down; a reinforcement 62 for holding the upper ends of the guide rails 57 and 57 and ratatably holding the upper end of the screw shaft 58. The lens shaft holder 61 is always rotatively energized downward by the spring force of the spring 54 of the pressure adjusting mechanism 45 to be pressed to the stage 60. Moreover, a sensor S for detecting an abutment of the lens shaft holder 61 is attached to the stage 60.

When the screw shaft 58 is normally or reversely rotated by a normal or reverse rotation of the pulse motor 59, the stage 60 is elevated or lowered along the guide rails 57 and 57 by the screw shaft 58, and then the lens shaft holder 61 is elevated or lowered integrally with the stage 60. Accordingly, the carriage 22 is swung around the carriage swing shaft 21.

<Edge Thickness Measuring System 18>

An edge thickness measuring system (lens edge measuring apparatus) 18 as the lens shape measuring apparatus of the present invention includes, as shown in FIG. 5, a measuring element 41 disposed in a rear edge upper part of the processing chamber 4; a measurement shaft 42a provided parallel to the lens shafts 23 and 24, one end thereof being provided integrally with the measuring element 41; and a measuring unit (measuring unit moving amount detecting unit) 42 disposed close to the rear edge upper part of the side wall 11b, and outside the processing chamber 4. This measurement shaft 42a penetrates the side wall 11b to be protruded inside and outside the processing chamber 4.

(Measuring Element 41)

The measuring element 41 includes, as shown in FIG. 5, FIGS. 11 to 16, a feeler holding member 100, and a pair of feelers 101 and 102. The feeler holding member 100 includes a successively provided portion 100a extended left and right, and parallel opposing pieces 100b and 100c provided to be protruded in the same direction in both left and right ends of the successively provided portion 100a. The feelers 101 and 102 are formed to be cylindrical, and attached to the tips of the opposing pieces 100b and 100c to face each other. In the tips of the feelers 101 and 102, slopes 101a and 102a are formed to be inclined to face the successively provided port 100a. Accordingly, as shown in FIGS. 13A and 13B, circular-arc contact edges 101b and 102b are formed in the tips of the feelers 101 and 102. Further, tips 101b1 and 102b1 of the contact edges 101b and 102b of the feelers 101 and 102 are provided on the same plane as that of the tips 100b1 and 100c1 of the opposing pieces 100b and 100c.

(Measuring Unit 42)

A measuring unit (measuring element moving amount detecting unit) 42 includes, as shown in FIGS. 11A and 11B, and FIGS. 12A and 12B, brackets 104 and 105 fixed to a tray 12, and a fixed table 106 attached to the upper ends of the brackets 104 and 105. The measuring unit 42 further includes a measuring element moving amount detecting mechanism 107 and a measuring element rotating apparatus 108 disposed on the fixed table 106.

Measuring Element Moving Amount Detecting Mechanism 107

This measuring element moving amount detecting mechanism 107 includes a plurality of guide rails 109, 110 and 111 (see FIG. 14) extended in the same direction as that of the measurement shaft 42a, and attached on the fixed table 106, a shaft holding slider (shaft holding member) 112 installed (held) on the guide rail 109 so as to be moved in a longitudinal direction.

Figure 13:
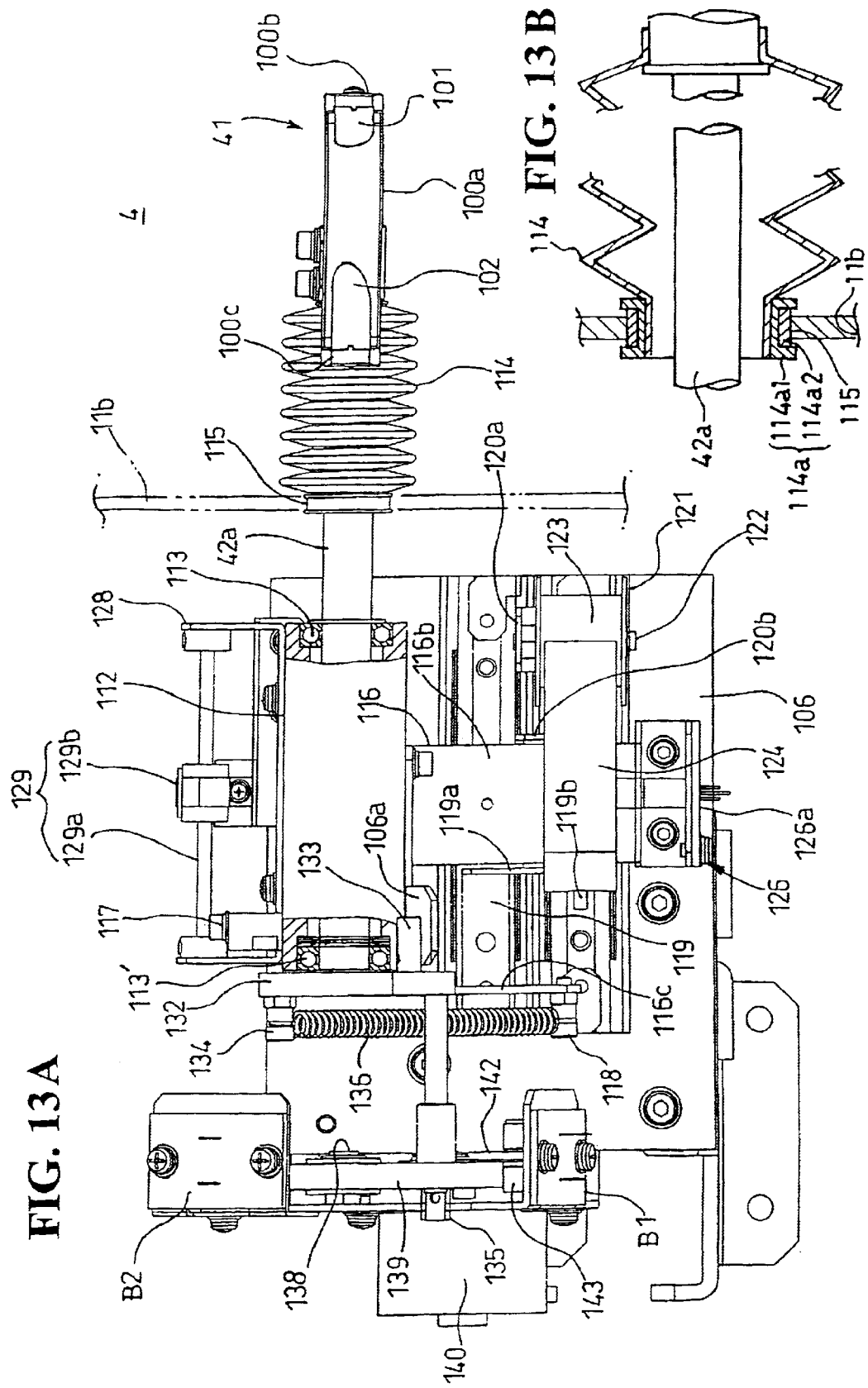
FIGS. 13A and 13B show the lens drive systems of the present invention.
Figure 14:
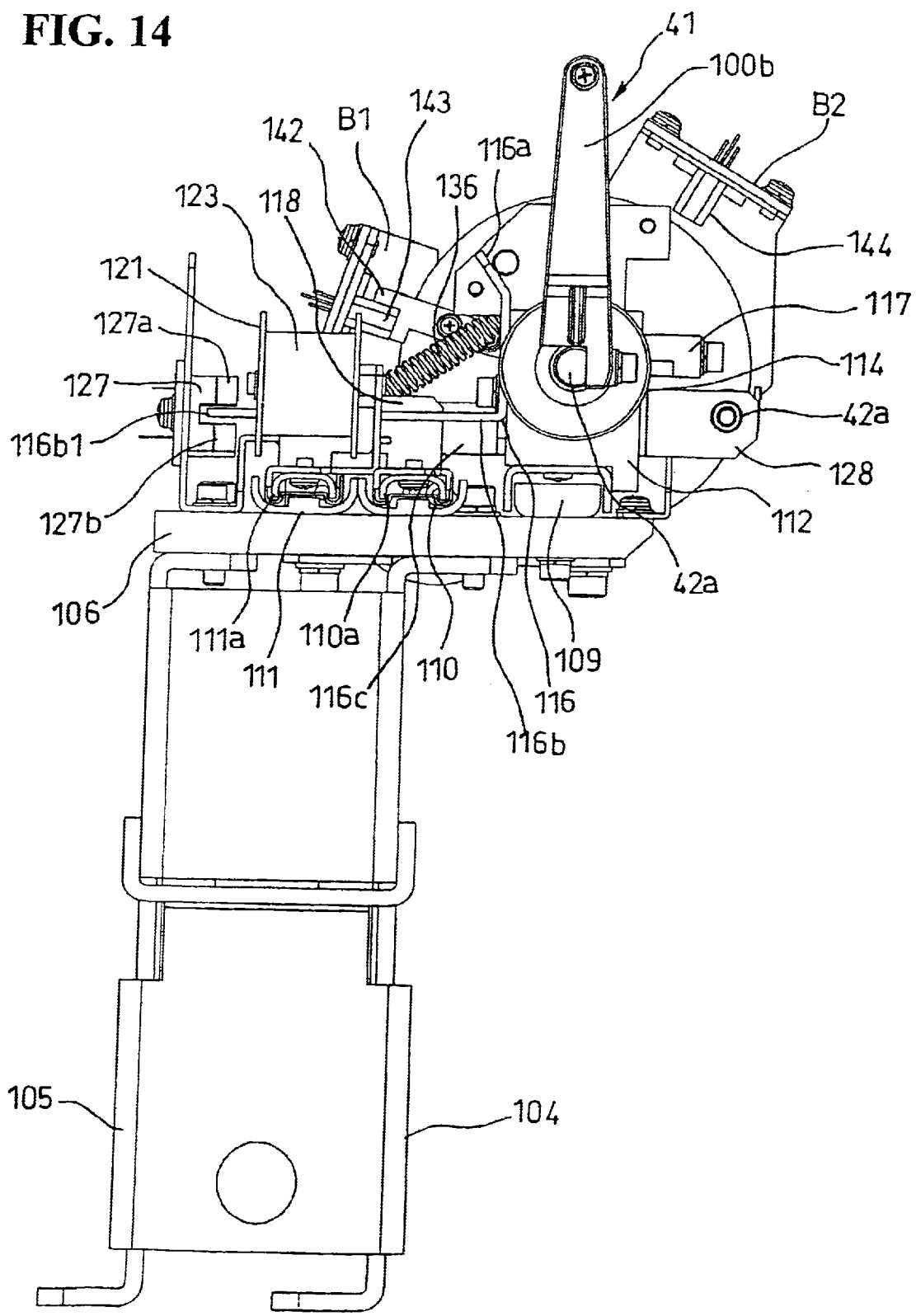
FIG. 14 is a right side view of the measuring unit of FIG. 13A.
Figure 15:
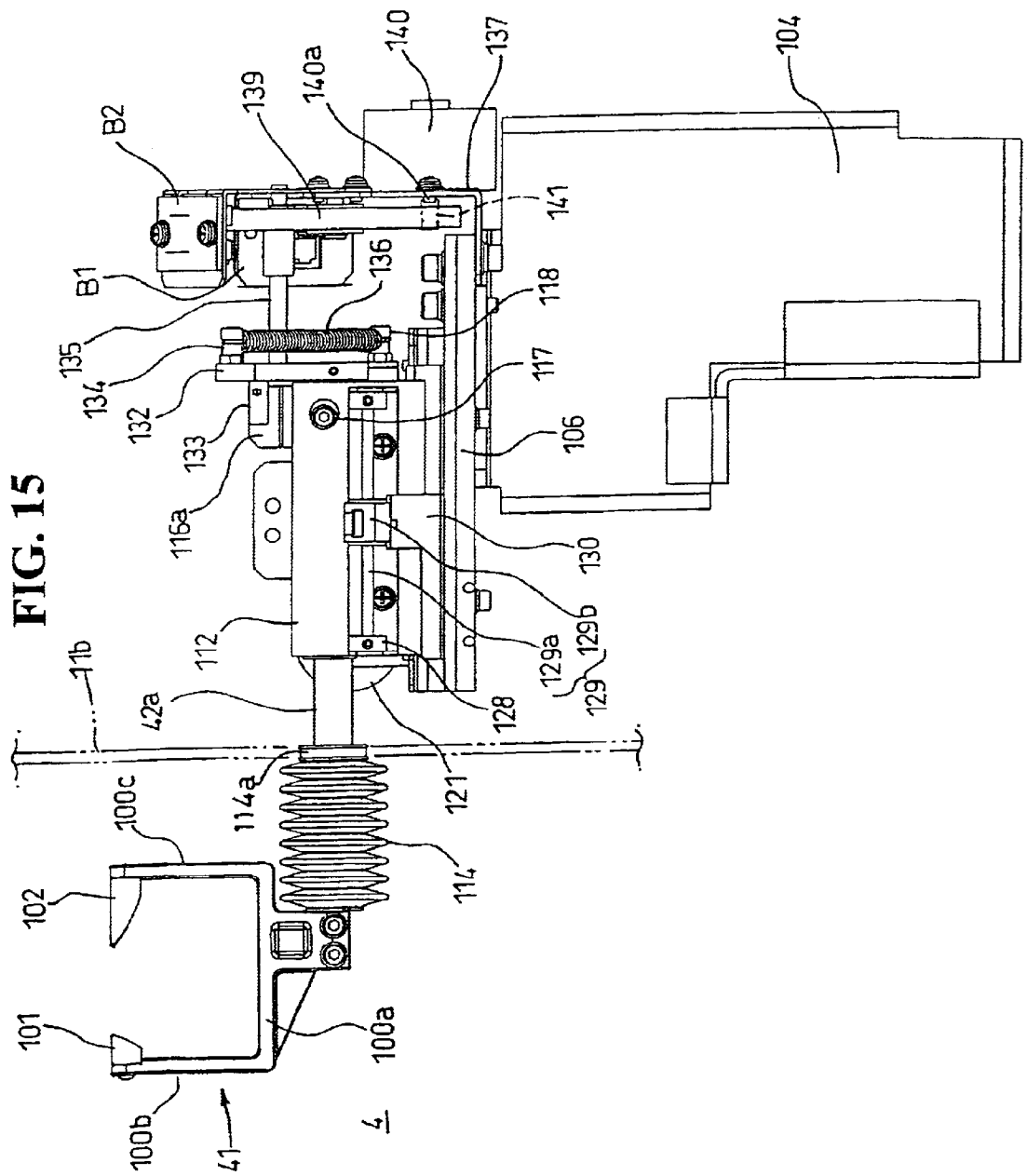
FIG. 15 is a right side view of the measuring unit of FIG. 14.
Figure 16:
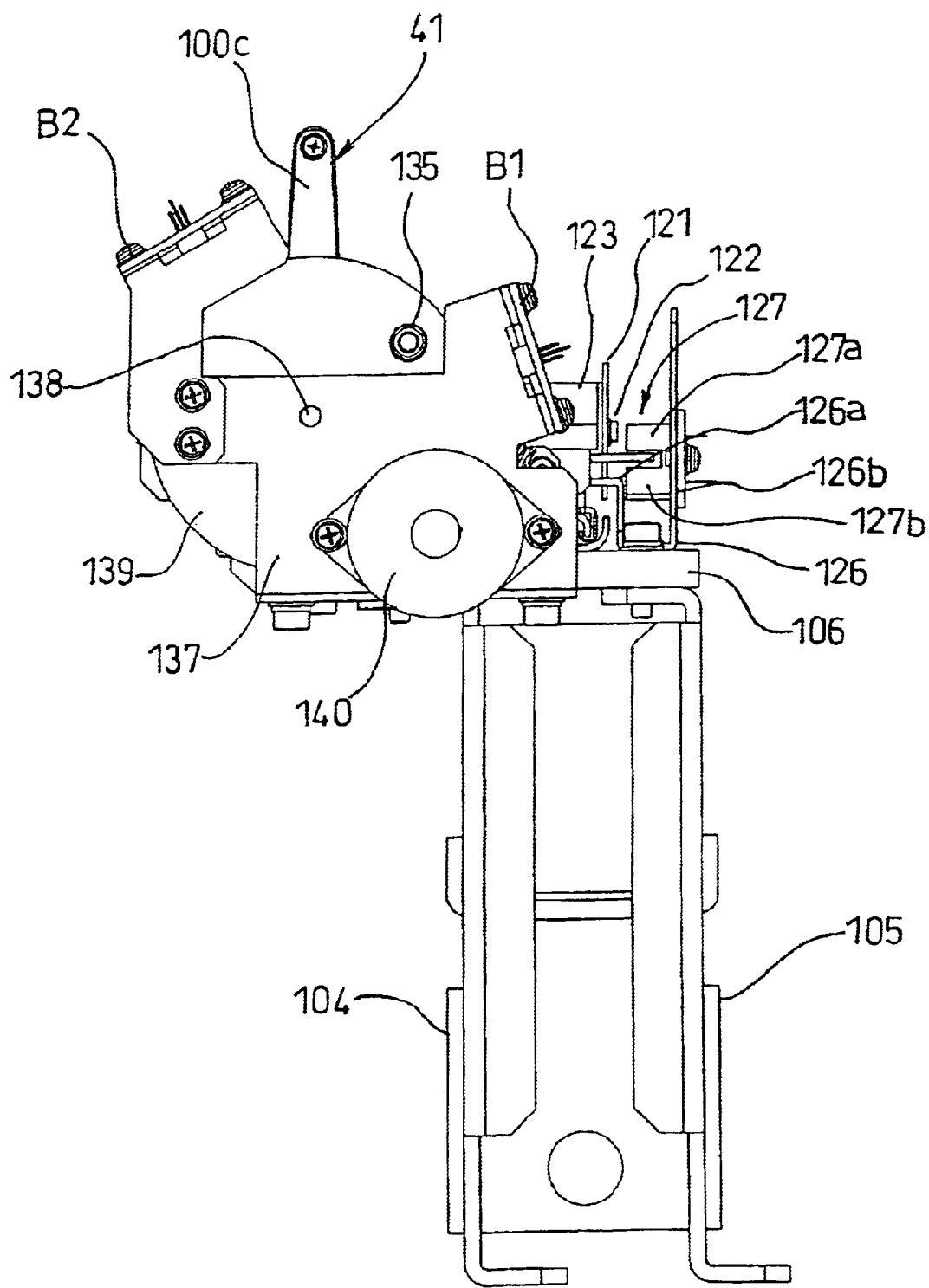
FIG. 16 is a right side view of the measuring unit of FIG. 15.

A portion of the measurement shaft 42a protruded from the processing chamber 4 is, as shown in FIG. 13, is attached to the slider 112 so as to be axially rotated via bearings 113 and 113' of the side wall 11b side. In FIGS. 14 and 15, a reference numeral 115 denotes an insertion hole (through-hole) formed in the side wall 11b to insert the measurement shaft 42a.

A bellows cover 114 fitted on the outer circumference of the measurement shaft 42a is provided between the measuring element 41 and the side wall 11b, preventing grinding liquid in the processing chamber 4 from being leaked from the insertion hole (through-hole) 115 to the measuring unit 12 side. In FIG. 5, the cover 114 is omitted for convenience.

In a connection portion (base part of the successively provided portion 100a) between the measurement shaft (rotation shaft) 42a and the successively provided portion 10a in the bellows cover 114, and in a connection portion between the cover 114 and the insertion hole 115, double ring structures 114a are provided. Each connection portion is sealed from fluid.

That is, as shown in FIG. 13B, the double-ring structure 114a includes an inner ring 114a1 U-shaped in section and fixed to the end of the bellows cover, and an outer ring 114a2 disposed in an annular groove of the inner ring 114a1 so as to be rotated. Then, the outer ring 114ais fitted and fixed in the shaft insertion hole 115 of the side wall 11b. By such a double-ring structure 114a, even when the measuring element 41 is rotated around the measurement shaft (rotation shaft), the cover 114 is prevented from being twisted. In addition, the measurement shaft (rotation shaft) 42a of the measuring element 41 is inserted through the insertion hole 115 of the processing chamber 4. By employing a similar structure in a connection portion between the cover 114 and the measuring element 41 side of the measurement shaft 42a, the cover 114 and the measurement shaft 42a can be rotated relative to each other, and sealing can be provided between the cover 114 and the measurement shaft 42a.

In addition, the measuring element moving amount detecting mechanism 107 includes a plate 116 attached to the side face of the guide rail 110 of the slider 112 (see FIGS. 12A and 12B to FIG. 14), and a stopper shaft (stopper) 117 provided in the end side face opposite the side wall 11b of the slider 112, and protruded horizontally in the side face opposite to the plate 116 (see FIGS. 11A to 11D, and FIGS. 13A to 15). The stopper shaft 117 is orthogonal to the measurement shaft 42a.

Figure 12:
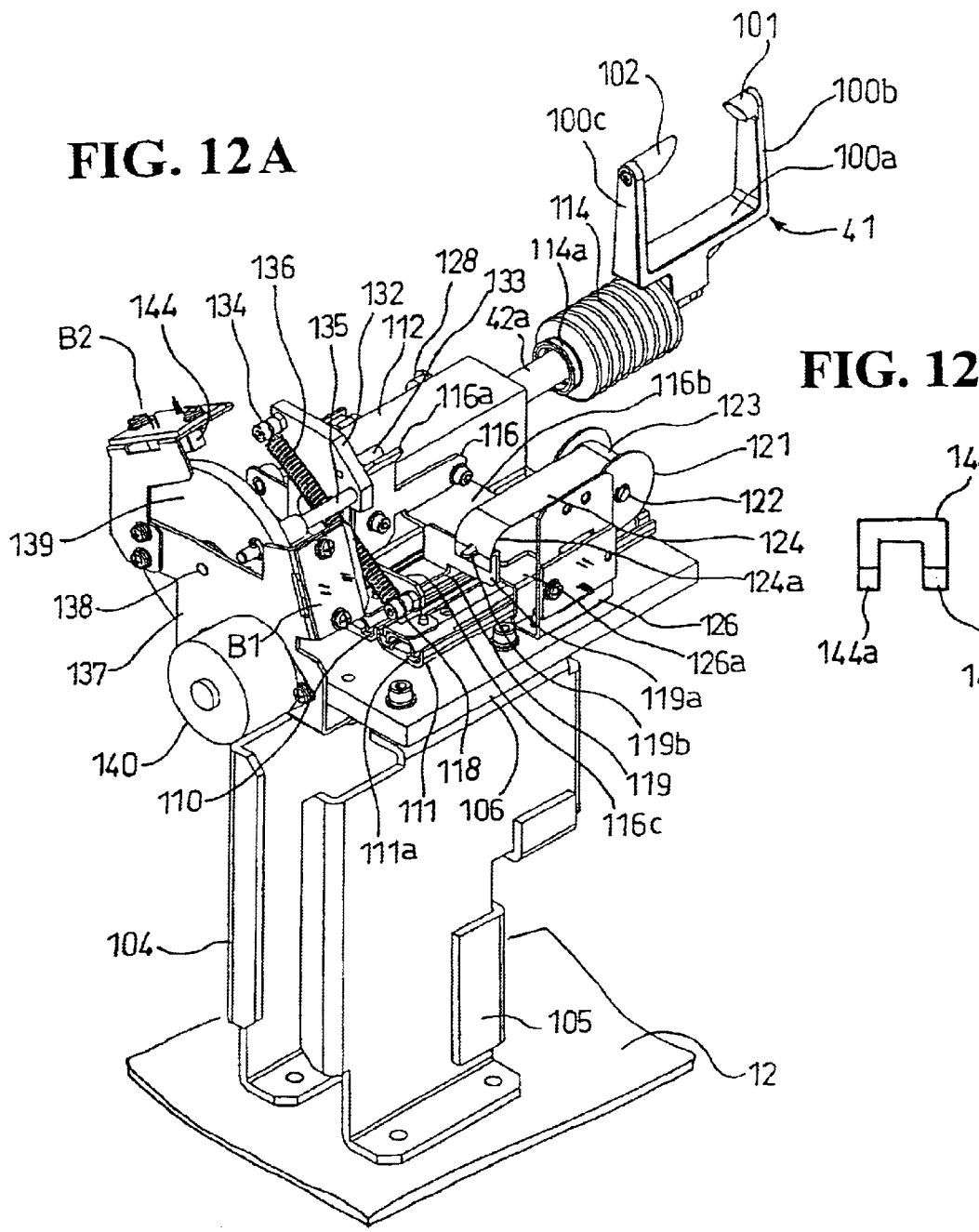
FIGS. 12A and 12B show the lens drive systems of the present invention.
Figure 19:
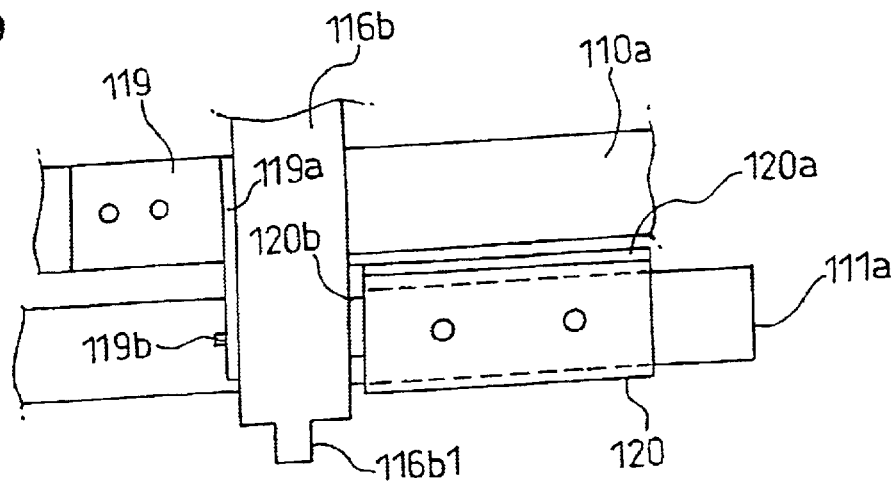
FIG. 19 is a partial plan view schematically showing main portions of an engaging plate portion of FIGS. 12A and 12B.

As shown in FIGS. 12 to 14, an inclined stopper plate 116a is integrally provided in the upper end of the plate 116 corresponding to the stopper shaft 117. In the lower end of the plate 116, a horizontal locking plate 116b is integrally provided so as to be extended horizontally to cross the upper parts of the guide rails 110, and 111, and a spring attaching plate 116c is integrally provided to as to cross the upper parts of the guide rails 110 and 111 from a position corresponding to the bearing 113' of the plate 116 in a horizontal direction. In the tip of the horizontal locking plate 116b, as shown in FIG. 19, a small-width light shielding plate 116b1 for detecting a position is integrally provided. In addition, as shown in FIGS. 12A and 12B, FIGS. 13A and 13B, and FIG. 16, a spring locking pin 118 is attached to the tip of the spring attaching plate 116c.

On the guide rails 110 and 111, slide rails 100a and 111a are held so as to be moved in a longitudinal direction. A spring supporting plate 119 is attached to the end of the bearing 113' side of the slide rail 110a. In this spring supporting plate 119, a locking plate (stand-up plate) 119a is formed to be extended to the guide rail 111a, and a spring locking projection 119b is provided to be projected in the locking plate 119a.

Figure 20:
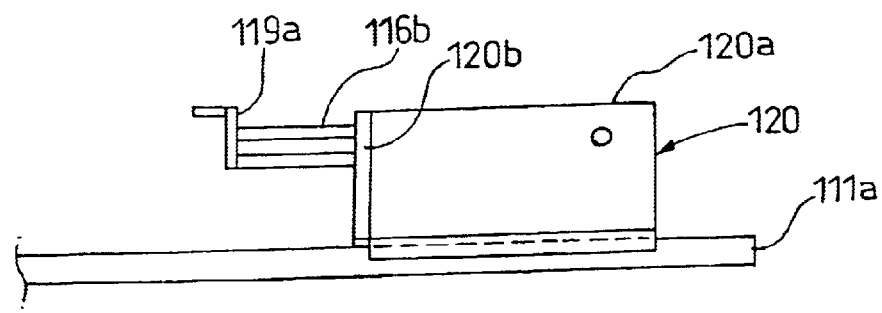
FIG. 20 is a front view of FIG. 19.

As shown in FIGS. 19 and 20, a reel attaching plate 120 is attached to the bearing 113 (side wall 11b) side of the slide rail 111a. This reel attaching plate 120 includes a reel attaching plate 120a positioned in the side part, and a locking plate (stand-up plate) 120b provided in the horizontal locking plate 116b side. The reel attaching plate 120a is extended in the extending direction of the slide rail 111a and upward, and the locking plate 120b is extended in a direction for crossing the slide rail 111a and upward.

Figure 11:
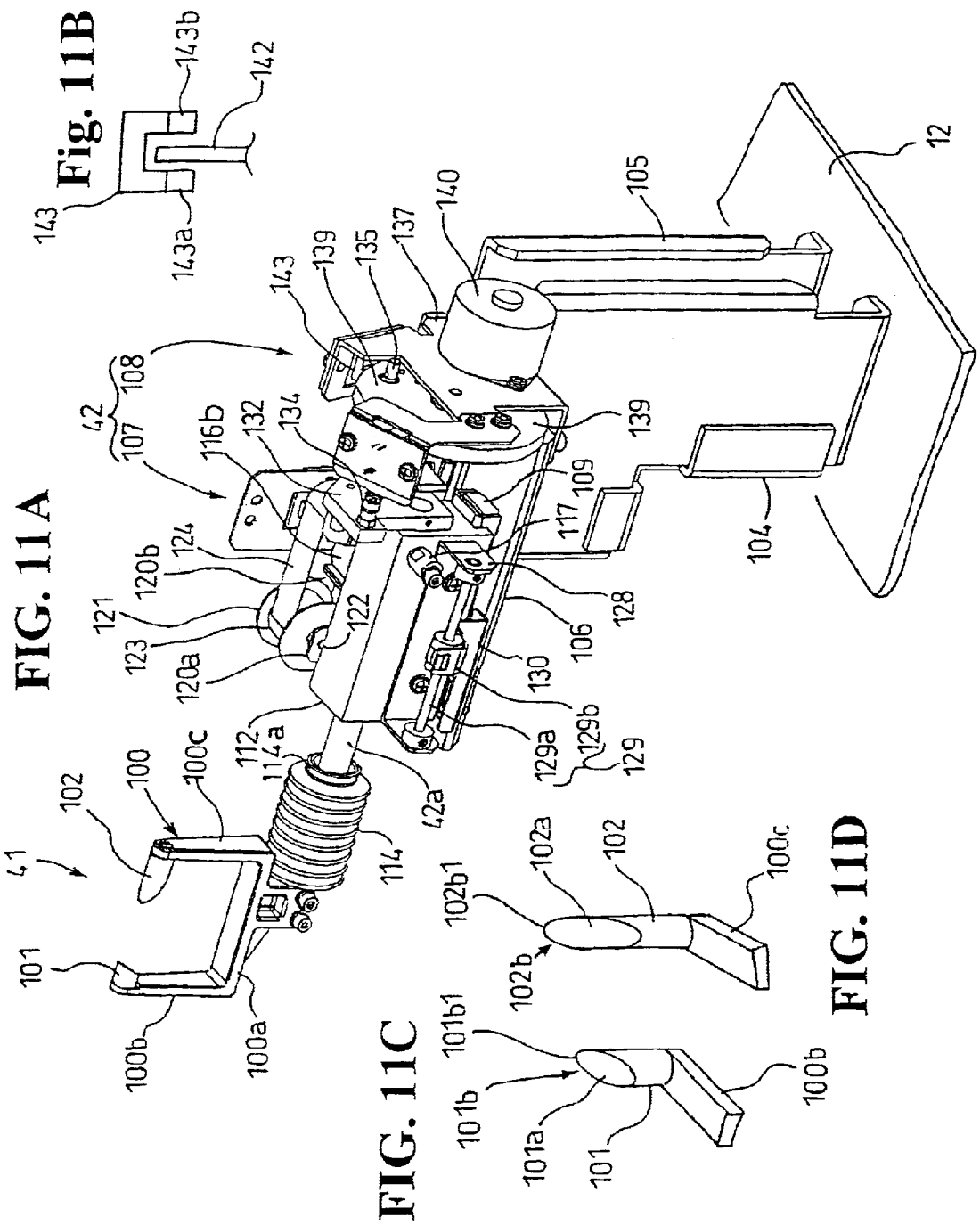
FIGS. 11A to 11D show the lens drive systems of the present invention.

A spring attaching reel 121 is attached to the reel attaching plate 120a so as to be rotated via a supporting shaft 112 as shown in FIG. 11. A leaf spring 123 is wound on the reel 121 as shown in FIGS. 11A to 14, and FIG. 18. For the leaf spring 123, a flat spiral spring or the like to be wound on the reel 121 by its own spring force is used. A base end (one end) of a locking plate 124 is fixed to the delivery end of the leaf spring 123. In the tip (other end) of the locking plate 124, as shown in FIGS. 12A and 12B, and FIGS. 13A and 13B, a bent portion 124a is provided so as to be bent downward in a circular-arc shape. A locking hole 125 is formed on the bent portion 124a. The spring locking projection 119b is inserted into the locking hole 125 as shown in FIGS. 12A and 12B.

Thus, the leaf spring 121 presses the spring supporting plate 119 to the horizontal locking plate 115b side of the plate 116 by a winding force on the reel 121, and the reel attaching plate 120 to the horizontal locking plate 116b side.

Figure 21:
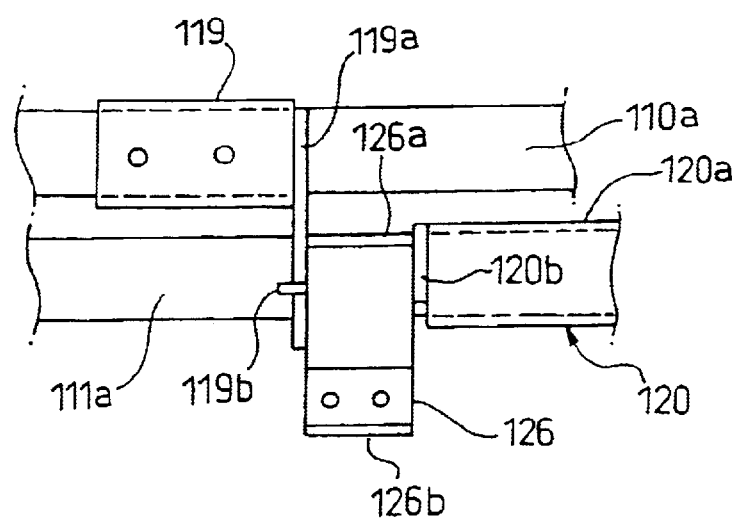
FIG. 21 is a plan view showing a state where a horizontal locking plate portion of FIG. 19 is removed.

A bracket 126 attached on the fixed table 106 is disposed in the side of the longitudinal-direction center of the guide rail 111. This bracket 126 includes a stopper plate 126a positioned lower than the horizontal locking plate 116b and horizontally protruded above the guide rail 111, and a sensor attaching plate 126b stood up upward. Then, as shown in FIGS. 19 to 21, by a spring force of the leaf spring 121, the locking plate 119a of the spring supporting plate 119 is abutted on one side of the stopper plate 126a and the horizontal locking plate 116b, and the locking plate 120b of the reel attaching plate 120 is abutted on the other side of the horizontal locking plate 116b and the stopper plate 126a provided in the plate 116 of the slider 112 side. Thus, the slider 116 is held in the center (movement start origin) of the moving direction of the guide rail 109.

As shown in FIGS. 13A and 13B, and FIGS. 14 and 16, a photoelectric origin sensor 127 is attached to the sensor attaching plate 126b to detect a movement start of the slider 112. This origin sensor 127 includes a light emitting element 127a and a photodetecting element 127b. When the slider 112 is at the movement start origin (measuring reference position), the light shielding portion 116b1 provided in the tip of the horizontal locking plate 116b is positioned between the light emitting element 127a and the photodetecting element 127b to shut off a light direction from the light emitting element 127a to the photodetecting element 127b. Thus, the movement start origin of the slider 112 is detected.

(Moving Amount Detecting Sensor)

As shown in FIGS. 11 to 15, a U-shaped bracket 128 is attached to the side face of the stopper shaft 117 of the slider 112, Between the bracket 128 and the fixed table 106, a moving amount detecting sensor (moving amount detecting means) 129 is provided for detecting a moving amount of the slider 112, i.e., moving amounts of the measurement shaft 42a and the measuring element 41. The moving amount detecting sensor 129 includes a scale 129a attached to the bracket 128 in parallel with the measurement shaft 42a, and a reading head (slider) 129b for reading a movement of the scale 129a. The reading head 129b is fixed to the fixed table 106 via a bracket 130.

For the moving amount detecting sensor 129, for example Inductsin (product name) or Linear Inductsin (product name) as a displacement measuring scale of an electromagnetic induction system is used. The Inductsin includes a thin and long scale having only one phase of a rectangular-wave conductor circuit A imprinted in a glass plate, and a slider (reading head) having two phases of rectangular-wave short and long conductor circuits B and C imprinted adjacently in a short glass plate disposed on the scale. By sliding the slider on the scale in a longitudinal direction, voltages of sin and cos waves difference in phase are induced in the conductor circuits B and C, and a moving direction and a moving amount can be detected as an absolute amount from the voltages of different phases. In other words, the Inudotsin uses a principle of resolver.

(Measuring Element Position Switching Mechanism)

The measuring element 41 is switched to one of two positions, i.e. a stand-up retreating position and a horizontally laid-down measuring position as shown in FIG. 5, by the measuring element rotating apparatus (measuring element position switching mechanism) 108 as position switching means (measuring element rotating means).

This measuring element rotating apparatus (measuring element position switching apparatus) 108 includes an attaching plate 132 fixed to the side end of the beaming 113' of the measurement shaft 42a, a rotation regulating pin (stopper pin) 133 projected in the surface of the slider 112 of the attaching plate 132, a spring locking pin 134 and a rotation transmission shaft 135 projected in a surface opposite to the slider 112 side of the attaching plate 132, and a coil spring 136 having both ends locked by the spring locking pins 118 and 134.

Figure 17:
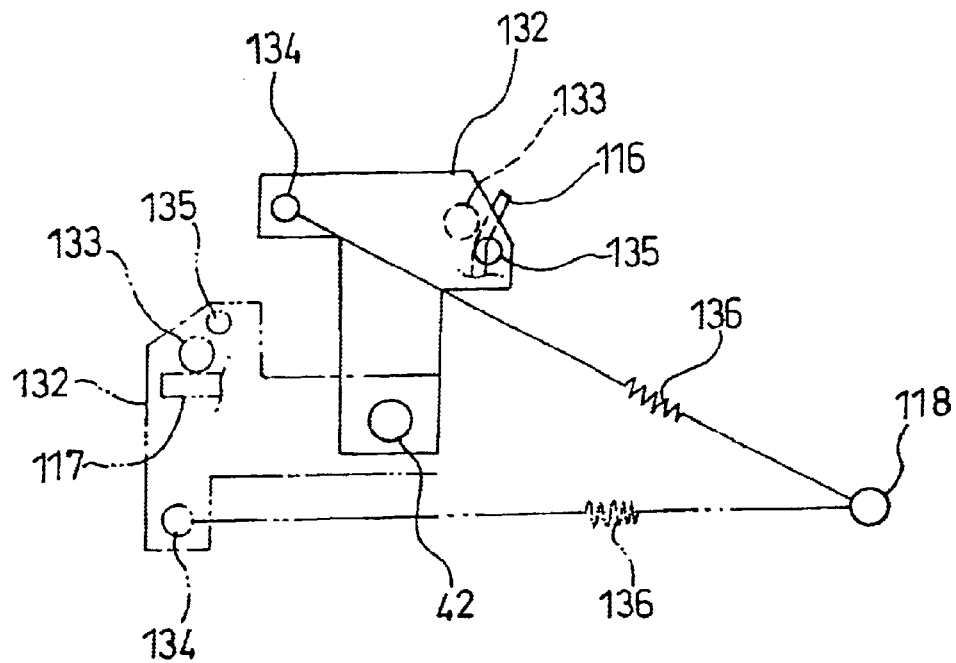
FIG. 17 is an operation explanatory view of an attaching plate and a coil spring shown in FIGS. 12A and 12B.
Figure 18:
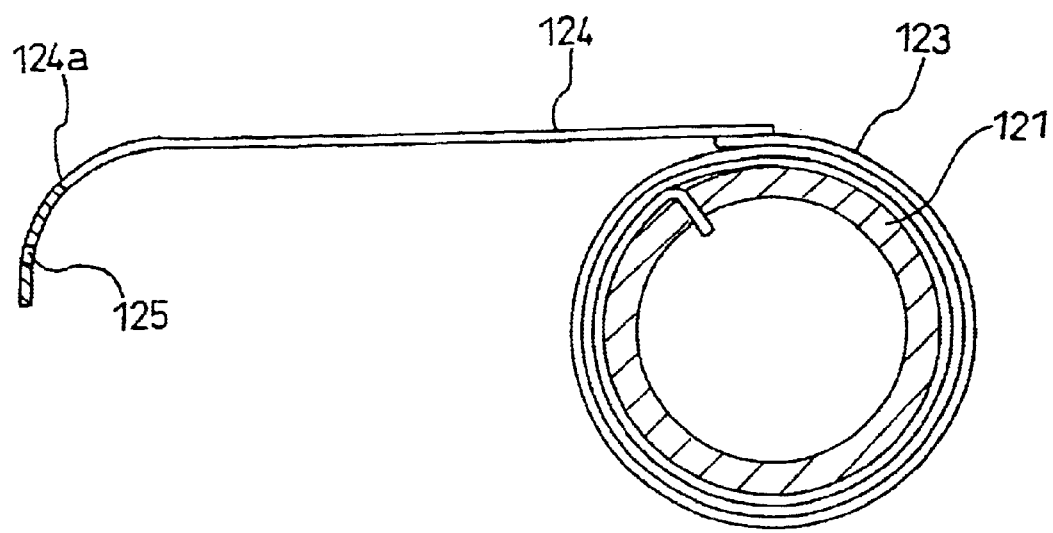
FIG. 18 is an explanatory view of a leaf spring shown in FIGS. 12A and 12B.

When the attaching plate 132 stands up as indicated by a solid line in FIG. 17, and the coil spring 136 is positioned upper than the measurement shaft 42a, the coil spring 136 abuts the rotation regulating pin 133 on the stopper plate 116a. In this position, the measuring element 41 is positioned in the stand-up retreating position as shown in FIG. 5, and FIGS. 11 to 16.

On the other hand, when the attaching plate 132 is rotated horizontally by 90° as indicated by a two-dot chain line of FIG. 17, and the coil spring 136 is positioned lower than the measurement shaft 42a, the coil spring 136 abuts the rotation regulating pin 133 on the stopper shaft 117. In this position, the measuring element 41 is positioned in the horizontally laid-down measuring position.

A bracket 137 is attached to the end of the attaching plate 132 side of the fled table 106. A large-diameter gear 139 is attached to the bracket 137 so as to be rotated via a shaft 138 coincident with an axis of the measurement shaft 42a. Then, the rotation transmission shaft 135 is inserted into the circumferential part of the large-diameter gear 139 so as to be slid.

In addition, a pulse motor 140 is fixed to the bracket 137, and a pinion 141 attached to an output shaft 140a of the pulse motor 140 is engaged with the large-diameter gear 139. Further, a light shielding plate 142 is attached to one side face of the large-diameter gear 139 so as to be protruded from the circumferential edge, and the bracket 137 includes photoelectric position detecting sensors 143 and 144 attached at an interval of 90° in the circumferential direction of the large-diameter gear 139 via brackets B1 and B2. As shown in FIG. 11B, the position detecting sensor 143 includes a light emitting element 143a and a photodetecting element 143b, while the position detecting sensor 144 includes a light emitting element 144a and a photodetecting element 144b as shown in FIG. 12B.

Then, when the light shielding plate 142 is positioned between the light emitting element 143a and the photodetecting element 143b to shut off a light directed from the light emitting element 143a to the photodetecting element 143b, the rotation regulating pin 133 is abutted on the stopper plate 116a, and the measuring element 41 is positioned in the stand-up retreating position as shown FIG. 7, and FIGS. 11A to 16.

Furthermore, when the light shielding plate 142 is positioned between the light emitting element 144a and the photodetecting element 144b to shut off a light directed from the light emitting element 144a to the Photodetecting element 144b, the rotation regulating pin 133 is abutted on the stopper shaft 117, and the measuring element 41 is positioned in the horizontally laid-down measuring position.

(Control Circuit)

Figure 9:
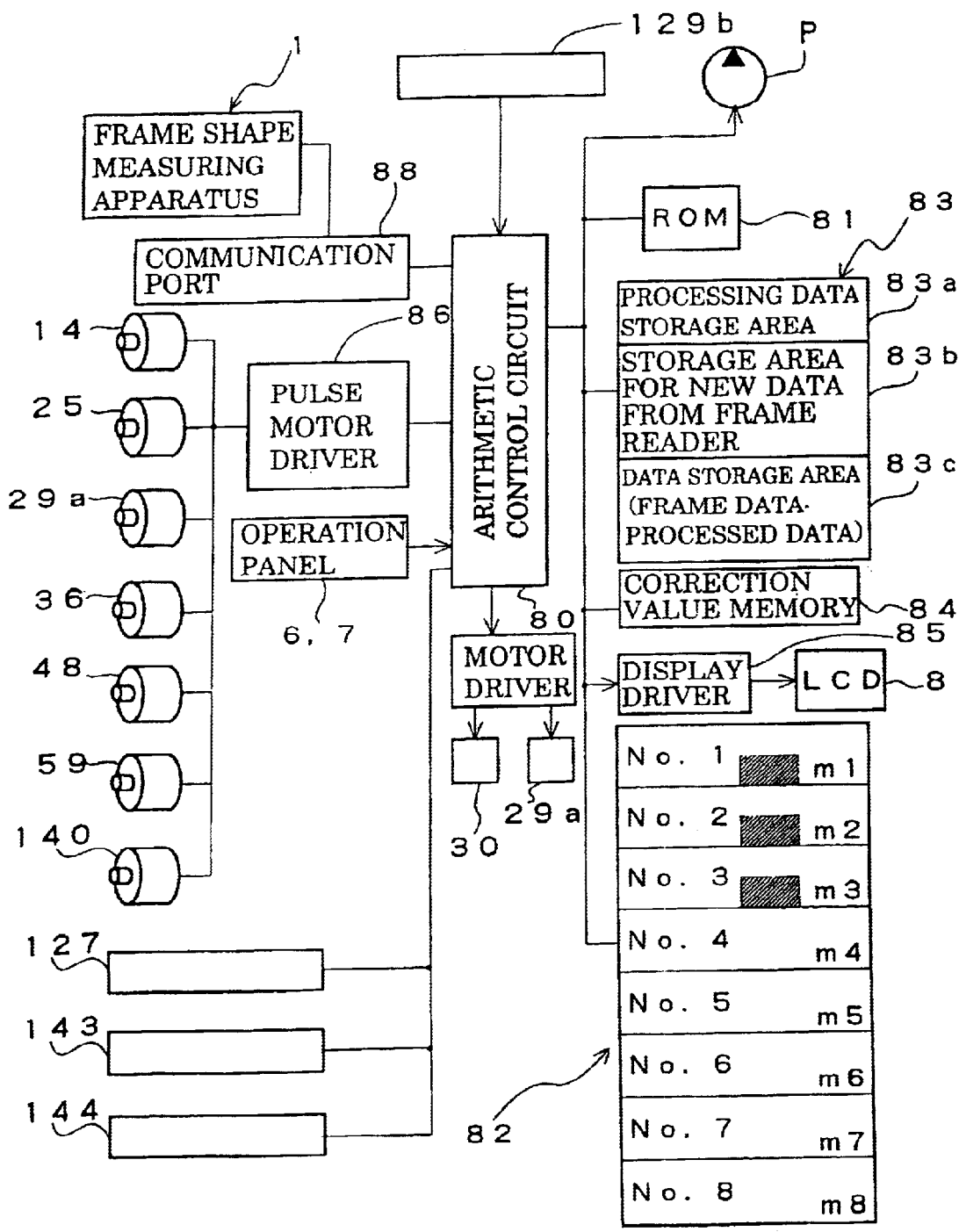
FIG. 9 is a control circuit diagram of the lens grinding apparatus shown in FIG. 1 to FIG. 7.

The above-described operation panels 6 and 7, that is, the switches of the operation panels 6 and 7 are connected to an arithmetic control circuit (arithmetic control means) 80 including a CPU as shown in FIG. 9. Moreover, the arithmetic control circuit 80 is connected to a ROM 81 as storage means, a data memory 82 as storage means, a RAM 83 and a correction value memory 84.

Furthermore, the arithmetic control circuit 80 is connected to the liquid crystal display device 8 via a display driver 85 and to a pulse motor driver 86. The pulse motor driver 86 is controlled in motion thereof by the arithmetic control circuit 80 to control the motion (drive) of the various Rinds of drive motors in the grinding portion 10, that is, the base drive motor 14, the lens shaft drive motor 25, the swing arm drive motor 36, the mover displacement motor 43, the pulse motor 59, 140 or the like. Note that pulse motors are used for the base drive motor 14, the lens shaft drive motor 25, the swing a drove motor 36, the mover displacement motor 48 and the like.

The arithmetic control circuit 80 is further connected to the grinding wheel drive motor 30 and the grinding wheel drive motor 39a via the motor driver 86a.

Furthermore, the arithmetic control circuit 80 is connected to the frame shape measuring apparatus 1 in FIG. 1 via a communication port 88 to receive the lens shape data such as the frame shape data and the lens shape data from the frame shape measuring apparatus (lens shape measuring apparatus) 1.

In addition, detecting signals from the origin sensor 127, and the position detecting sensors 143 and 144 of He measuring unit 42, and moving amount detecting signals from the reading head (slider) 129b of the moving amount detecting sensor (moving amount detecting means) 129 are inputted into the arithmetic control circuit 80.

The arithmetic control circuit 80 determines each of the coordinate positions of the front refracting surface (the left surface of the eyeglass lens in FIG. 5) of the eyeglass lens ML and the rear refracting surface (the right surface of the eyeglass lens in FIG. 5) thereof at the lens shape data ($\theta i$, $\rho i$), based on a drive pulse for the base drive motor 14, drive pulses for the lens shaft drive motor 25, the pulse motor 59 and the like, which are controlled in motion thereof based on the lens shape data ($\theta i$, $\rho i$) from the frame shape measuring apparatus 1. Subsequently, the arithmetic control circuit 80 determined the edge thickness Wi at the lens shape data ($\theta i$, $\rho i$) by calculation from the determined coordinate positions of the front and rear refracting surfaces of the eyeglass lens ML.

Figure 10:
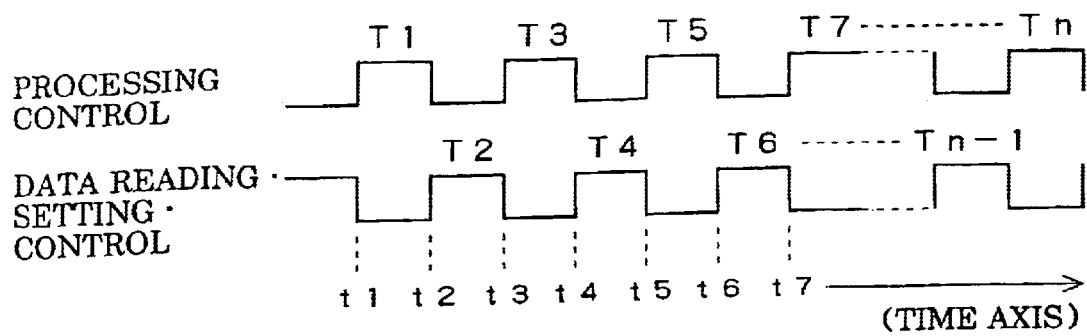
FIG. 10 is a time chart for explaining a control of the control circuit of FIG. 9.

When the arithmetic control circuit 80 reads out data from the frame shape measuring apparatus 1 or reads out data stored in storage areas m1 to m8 of the data memory 82 after starting control of processing, as shown in FIG. 10, the arithmetic control circuit 80 performs the control of processing and the control of the data reading or the layout setting in a time-sharing mode.

Specifically, when a period between time t1 and t2 is T1, a period between time t2 and t3 is T2, a period between time t3 and t4 is T3, ..., a period between time tn-1 and tn is Tn, the control of processing is performed during the periods T1, T3, ... and Tn, and the control of the data reading and the layout setting are performed during the periods T2, T4, Tn-1. Accordingly, during the grinding of the processed lens, the reading and storing of the next plurality of lens shape data, the data reading, the layout setting (adjustment) or the like can be performed, thus considerably improving a work efficiency of data processing.

Various kinds of programs for controlling the operations of the lens grinding apparatus 2 are stored in the above-described ROM 81. The data memory 82 is provided with the plurality of data storage areas. Moreover, the RAM 83 is provided with: a processing data storage area 83a for storing the processing data for the lens currently in processing; a new data storage area 83b for storing new data; and a data storage area 83c for storing the frame data, data for the lens already processed, or the like, Note that, as the data memory 82, a readable and writable flash EEPROM (FEEPROM) can be employed, or a RAM using a backup power supply can be employed, in which the content hereof cannot be erased even when the main power supply is turned off.

[Operations]

Next, description will be made for operations of the lens grinding apparatus including the arithmetic control circuit 80 having such a constitution.

<Reading of Lens Shape Data>

In a starting stand-by state, when the main power supply is turned on, the arithmetic control circuit 80 judges as to whether or not data reading from the frame shape measuring apparatus 1 is to be carried out.

Specifically, the arithmetic control circuit 80 judges as to whether or not the "data request" switch 7c an the operation panel 6 is pressed. When the "data request" switch 7c is pressed for requesting data, data of the lens shape information (θi, ρi) is read from the frame shape measuring apparatus 1 into the data reading area 83b of the RAM 83. The read data is stored (recorded) in any one of the storage areas m1 to m8 of the data memory 82, and then the layout screen is displayed on the liquid crystal display device 8.

<Processing Circumferential Edge of Eyeglass Lens>

The measuring element 41 is in a standing position as shown in FIG. 5, FIGS. 11 to 16, and FIG. 22 before the measurement of the eyeglass lens ML held between the lens shafts 23 and 24. In such a position, a light shielding plate 142 is positioned between the light emitting elements 143a and 143b of the position detecting sensor 143 to shut off a light directed from the light emitting element 143a to the light emitting element 143b, and a rotation regulating pin 133 is abutted on the stopper plate portion 116a by a spring force of the coil spring 136.

In such a sate, by pressing the "right" switch 6c or the "left" switch 6b, a processing operation is started, such as the edge thickness measurement, the V-groove setting, and the grinding of the eyeglass lens ML.

(Detection of Size of Lens Fixing Jig)

Figure 24:
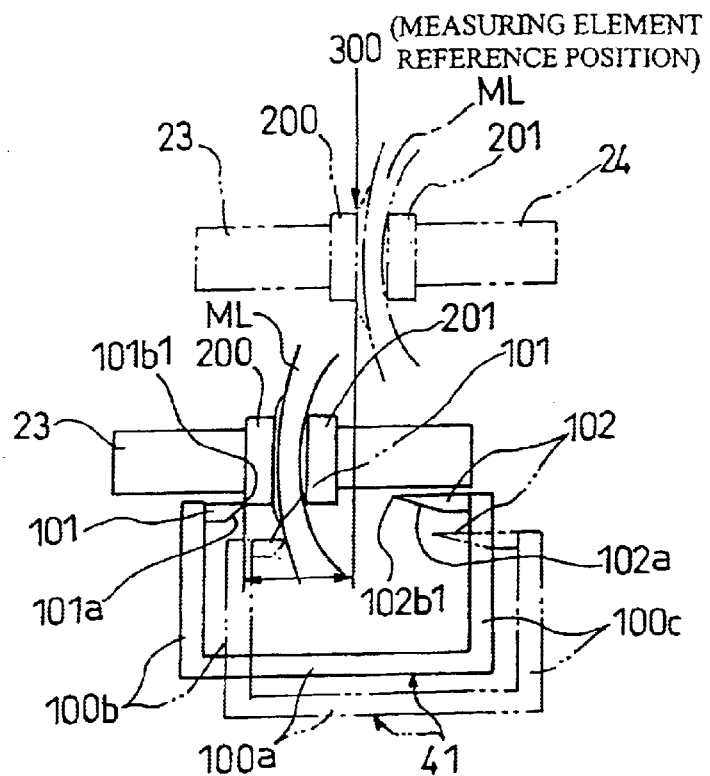
FIG. 24 is an operation explanatory view showing a relation among a lens fixing jig, a reference position of the measuring element, and the measuring element.

In measuring of the eyeglass lens ML, the eyeglass lens (lens to be processed) ML is adsorbed on a large-diameter lens fixing jig (lens fixing jig) 200 similar to that shown in FIG. 24, the eyeglass lens ML is attached to the lens shaft 23 by the lens facing jig 200, and pressed by a lens presser 201 of the lens shaft 24. In such a case, for example if a radius vector ρi of lens shape data (θi, ρi) of a crab-eye lens or the like (θi, ρi), measuring of an edge thickness of the eyeglass lens ML based on the lens shape data (θi, ρi) may destroy the measuring element 41. To prevent such destruction, the arithmetic control circuit 80 performs the following operation before edge thickness measuring.

That is, the arithmetic control circuit 80 controls the motion of the base drive motor 14 to move the carriage 22 left and right (axis direction of the measurement shaft 42a), and the tip of the lens shaft 23 is moved to a position (measuring element reference position 300) corresponding to a center between the opposing pieces 100b and 100c of the measuring element 41.

Figure 25:
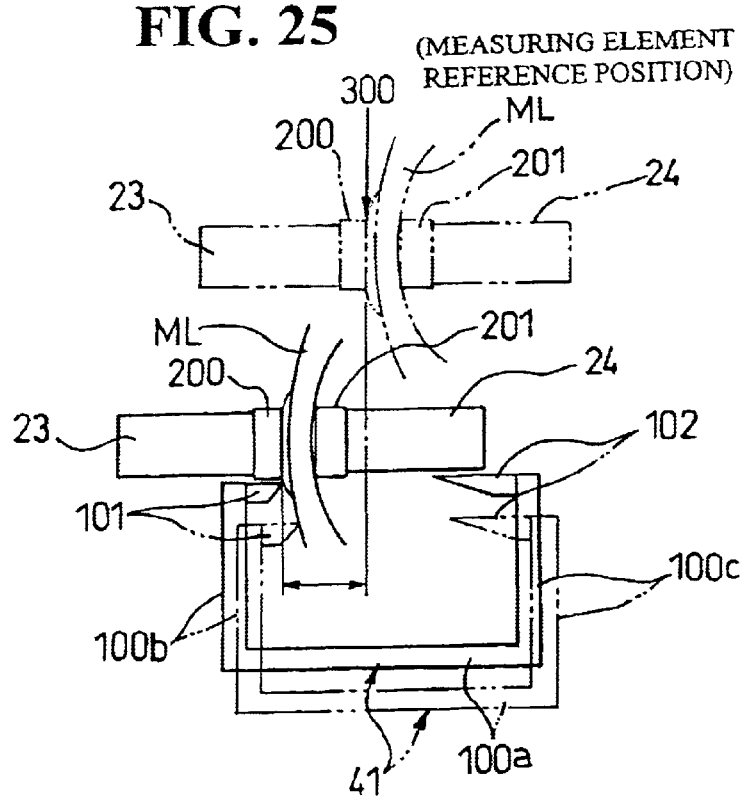
FIG. 25 is an operation explanatory view showing a relation among a lens fixing jig, a reference position of the measuring element, and the measuring element

Subsequently, the arithmetic control circuit 80 controls the motion of the base drive motor 14 to move the carriage 22 left and right (axis direction of the measurement shaft 42a). Accordingly, the lens fixing jig (lens adsorbing apparatus) 200 attached to the lens shaft 23 is moved from the measuring element reference position 300 indicated by a two-dot chain line of FIG. 25 to a position corresponding to the feeler 101 indicated by a solid line. In this case, the lens shafts 23 and 24, the eyeglass lens ML, and the lens pressing member 201 are also moved integrally with the lens fling jig 200. In FIG. 25, the feelers 101 and 102 of the measuring element 41 are close to the lens shafts 23 and 24. However, in the above-described movement, the feelers 101 and 102 of the measuring element 41 are not close to the lens shafts 23 and 24.

Then, the arithmetic control circuit 80 first controls the motion of the pulse motor driver 86 to rotate the pulse motor 59 normally, rotates the screw shaft 58 normally by the pulse motor 59, elevates the stage 60 along the guide rails 57 and 57 by the screw shaft 58, and then elevates the lens shaft holder 61 integrally with the stage 60. Thus, the carriage 22 is rotated upward around the carriage rotation shaft 21, and the eyeglass lens ML between the lens shafts 23 and 24 is moved between the feelers 101 and 102 of the measuring element 41. In this case, when the measuring element 41 is horizontally laid down as described later, if the lens fixing jig 200 is small diameter, then the lens shaft 23 and 24 are elevated to positions not clashing with the feeler 101.

Subsequently, the arithmetic control circuit 80 controls the motion of the pulse motor 140 to transmit rotation of the pulse motor 140 to the large-diameter gear. 139 by the pinion 141, and rotary-drives the large-diameter gear 139 in such a way as to move the light shielding plate 142 to the position detecting sensor 144 side. Rotation of the large-diameter gear 139 is transmitted to the attaching plate 132 via the rotation transmission shaft 135, and the attaching plate 132 is rotated from the solid line position or FIG. 17 to the position indicated by the two-dot chain line. By this rotation, the rotation regulating pin 133, the spring locking pin 134 and the measurement shaft 42a are rotated integrally with the attaching plate 132, and the measuring element 41 is rotated from a stand-up state indicated by a two-dot chain line of FIG. 22 to a horizontal position indicated by a solid line. Since the lens fixed jig 200 is attached to the front refracting surface of the eyeglass lens ML, the feelers 101 and 102 are prevented from being abutted on the eyeglass lens ML following the rotation thereof.

Figure 22:
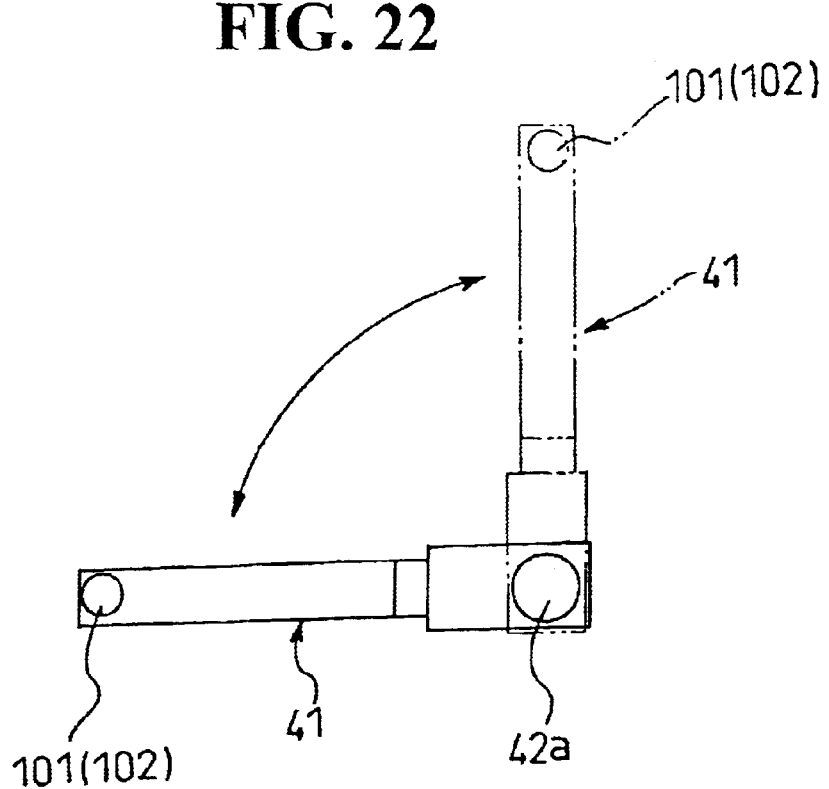
FIG. 22 is an operation explanatory view of a measuring element.

Therefore, when the lens fixing jig 200 is small in diameter, following the horizontal rotations of the attaching plate 132 and the measuring element 41, the attaching plate 132 is rotated from the solid line position to the two-dot chain line position, the rotation regulating pin 133, the spring locking pin 134 and the measurement shaft 42a are rotated integrally with the attaching plate 132, and the measuring element 41 is rotated from the stand-up position indicated by a two-dot chain line to the horizontal position indicated by a solid line in FIG. 22. Moreover, in this case, the light shielding plate 142 is moved between the light emitting element 144a to the photodetecting element 144b to shut off a light directed from the light emitting element 144a to the photodetecting element 144b. Where photodetecting element 144 detects the light shielding plate 142, this detecting signal is inputted to the arithmetic control circuit 80. Upon detection of the light shielding plate 142, the arithmetic control circuit 80 stops the motion of the pulse rotor 140. Thus, the arithmetic control circuit 80 determined that the lens fixing jig 200 and the lens pressing member 201 are small in diameter.

Figure 23:
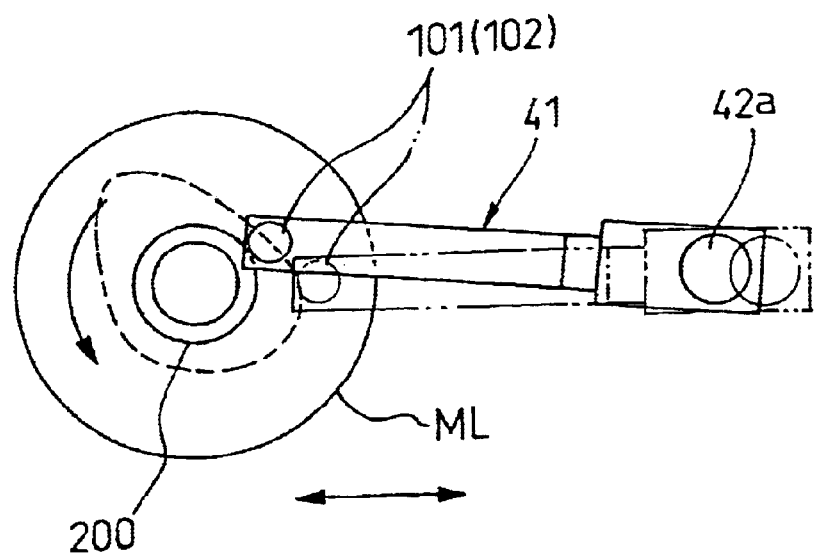
FIG. 23 is an explanatory view of a measuring operation by the measuring element.

On the other hand, when the lens fixing jig 200 is large in diameter (large diameter), following the above-described horizontal rotations of the attaching plate 132 and the measuring element 41, before the attaching plate 132 is rotated from the solid line position to the two-dot chain line position in FIG. 17, the feeler 101 of the measuring element 41 is abutted on the lens fixing jig 200 as shown in FIG. 23 before the horizontal position indicated by the solid line from the stand-up state indicated by the two-dot chain line in FIG. 22. Moreover, in this case, since the light shielding plate 142 stops just before it is moved between the light emitting element 144a and the photodetecting element 144b a light directed from the light emitting element 144a to the photodetecting element 144b is not shut off. As the time of horizontal rotation of the measuring element 41 is roughly constant, at a time when the measuring element 41 is laid down horizontally from the vertical state, if a state where the light directed from the light emitting element 144a to the photodetecting element 144b is not shut of by the light shielding plate 142 continues for a predetermined period, the arithmetic control circuit 80 determined that the lens fixing jig 200 is large in diameter. Then, the arithmetic control circuit 80 stops the pulse motor 14.

Then, the arithmetic control circuit 80 judges whether a minimum radius vector ρi of the lens shape data (θi, ρi) read in the above-described manner is larger or not than a radius of the lens fixing jig 200. If it is judged that the lens shape of the crab-eye lens or the like is larger than the outer shape of the lens fixing jig 200, the arithmetic control circuit 80 rotates the pulse motor 140 reversely to stand and retreat the measuring element 41 conversely to the above-described case, and displays a message, e.g., "SWITCH LENS FIXING JIG AND LENS PRESSING MEMBER TO SMALL-DIAMETER ONES" on the liquid crystal display 8, in order to switch the lens filing jig 200 and the lens pressing member 201 from large to small ones.

On the other hand, if the feelers 101 and 102 of the measuring element 41 are not brought into contact with the lens fixing jig, the arithmetic control circuit 80 recognizes that "a shape of the lens fixing jig is not large in diameter", and starts measuring an edge thickness shape Wi by bringing the feelers 101 and 102 into contact with the front and rear refracting surfaces of the eyeglass lens (lens to be processed) ML.

In the foregoing embodiment, then lens fixing jig 200 corresponds to the feeler 101, and the feeler 101 is abutted on the lens fixing jig 200 from the circumferential surface. However, there is no particular limitation in this regard.

For example, in order to position the eyeglass lens ML in the center of the feelers 101 and 102 of the measuring element 41, the motion of the base drive motor 14 is controlled to move the carriage 22 left and right (axis direction of the measurement shaft 42a). Then, when the measuring unit 41 is laid down horizontally, the feelers 101 and 102 of the measuring element 41 are brought close to the lens shaft 23 and 24 with small gaps. Then, the motion of the base drive motor 14 is controlled to move the carriage 22 left and right (axis direction of the measurement shaft 42a), thus moving the feeler 101 to the front refracting surface of the eyeglass lens ML. By this movement, when the movements of the measuring element 41 and the measurement shaft 42a are detected by the reading head 129b of the moving amount detecting sensor 129, the moving amounts of the carriage 22 and the lens shafts 23 and 24 up to these detecting positions are determined for the number of driving pulses of the base drive motor 14 and, based on movement/non-movement of the feeler 101 close to the measuring element reference position 300, it is possible to judge whether the lens fixing jig 200 is large or small in diameter. If the lens fixing jig 200 is large in diameter, the feeler 101 is abutted on the side face of the lens fixing jig 200. Thus, the moving amounts of the carriage 22 and the lens shafts 23 and 24 up to the abutment of the feeler 101 on the side fade of the lens fixing jig 200 are smaller compared with those when the feeler 101 is not abutted on the side is of the small-diameter fixing jig 200.

(Calculation of Edge Thickness Wi)

Then, the arithmetic control circuit 80 controls the motion of the pulse motor 140 to rotate and stop the measuring element 41 in the horizontal laid-down measuring position. Then, based on the lens shape data (θi, ρi), the arithmetic control circuit 80 controls the operation of the pulse motor driver 86 to rotate the pulse motor 59 normally or reversely, rotate the screw shaft 58 by the pulse motor 59 normally or reversely, elevate/lower the stage 60 along the guide rails 57 and 57 by the screw shaft 58, and elevate/lower the lens shaft holder 61 integrally with the stage 60. In this case, the feeler 101 corresponds to i=0 of an angle θi, and a radius vector ρi. Then, the arithmetic control circuit 80 controls the motion of the base drive motor 14 via the pulse motor driver 86, and abuts one feeler 101 of the measuring element 41 on the position i=0 of the angle θi, and the radius vector ρi of the surface (front refracting surface) of the eyeglass lens ML(see FIGS. 24 and 25).

Figure 3B:
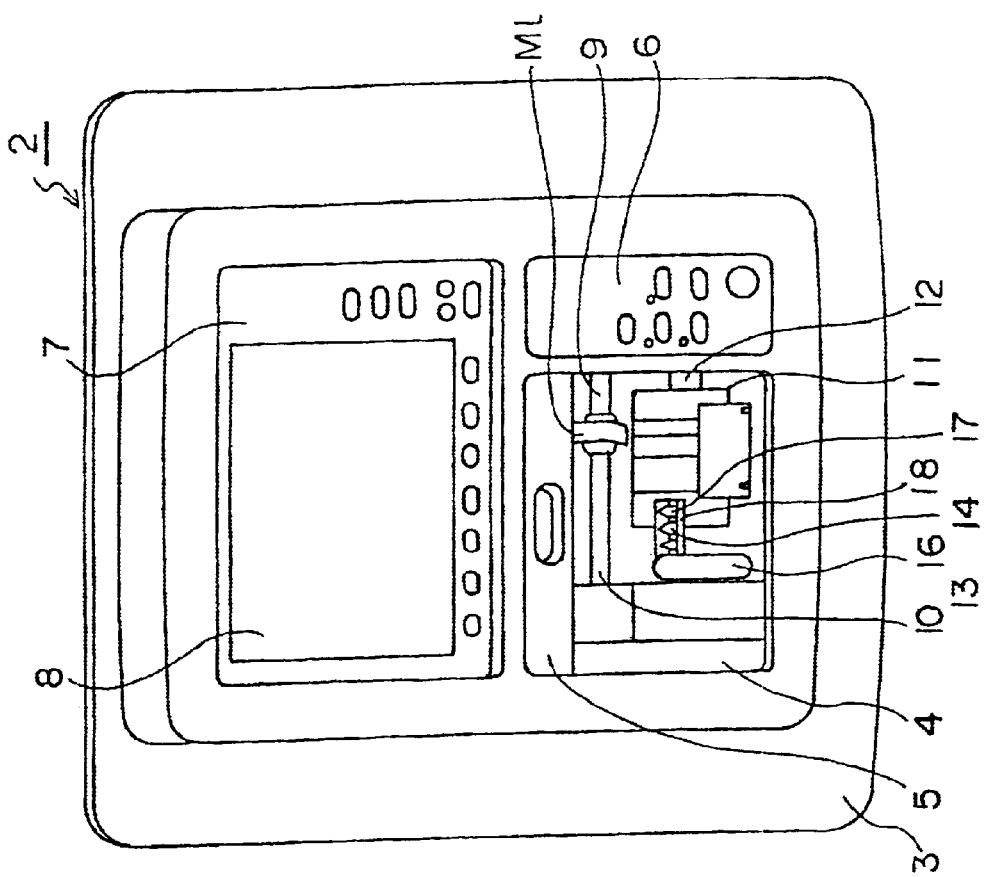
FIG. 3B being a plan view thereof when the cover is open.
Figure 3A:
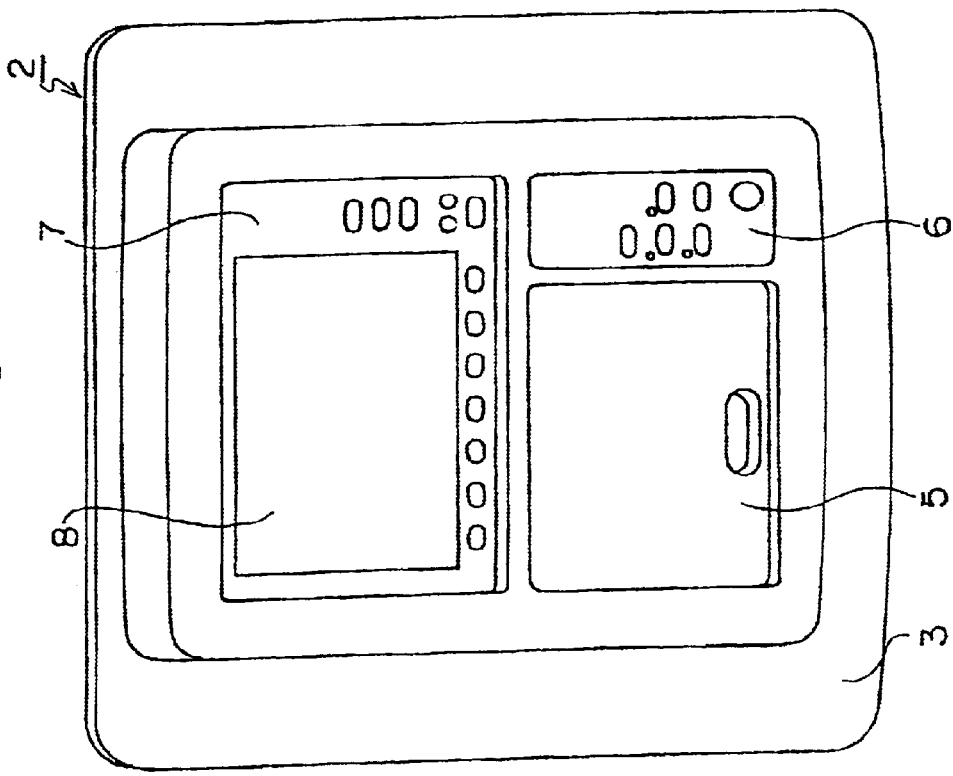

The abutment moves the measuring element 41 in a right direction in FIGS. 3 and 13B, and the measurement shaft 42a in the same direction integrally with the measuring element 41. In this case, the slider 112 for holding the measurement shaft 42a is also moved in the right direction of FIGS. 13A and 13B, and the plate 116 is moved in the same direction integrally with the slider 112. This movement causes the horizontal locking plate 116b of the plate 116 to press the locking plate 120b of the reel attaching plate 120 in a right direction in FIGS. 19 and 20, thereby moving and displacing the reel attaching plate 120 and the reel 121 in the right direction of FIGS. 13A and 13B integrally with the slide rail 11a. In this case, the lacking plate 119a of the spring supporting plate 119 is abutted on the stopper plate 126a of the bracket 126 fixed to the table 106 as shown in FIGS. 20 and 21, and thus cannot be moved in the right direction of FIGS. 13A and 13B. As a result, the leaf spring 123 wound on the reel 121 is delivered from the reel 121 following the rightward movement of the reel attaching plate 120 and the reel 121, and thus the slider 112 is spring-pressed in a left direction of FIGS. 13A and 13B by the locking plate 102b and the horizontal locking plate 116b.

When the slider 112 is moved in the axis direction of the measurement shaft 42a, the attaching plate 132, the coil spring 136,a and the rotation transmission shaft 135 are also moved in the same direction integrally with the slider 112, and the rotation transmission shaft 135 is moved in an axis direction relative to the large-diameter gear 139.

The arithmetic control circuit 80 then controls the motion of the lens shaft drive motor 25 with the pulse motor driver 86 to rotate the lens shafts 23 and 24 and the eyeglass lens ML at each predetermined angle θi (i=0, 1, 2, . . . n). Furthermore, the arithmetic control circuit 80 controls the motion of the pulse motor 59 with the pulse motor driver 86 to move the one feeler 101 to the position of the radius vector ρi at the angle θi (i=0, 1, 2, . . . n) such that in the abutted state of the eyeglass lens ML, the measuring element 41 can be moved back and forth in the axis direction of the measurement shaft 42a. In such a manner, the arithmetic control circuit 80 sequentially changes the abutment position of the feeler 101 on the eyeglass lens ML at every angle θi based on the lens shape data, that is, the lens shape information (θi, ρi).

In this case, the measuring element 41 is moved in the axis direction (left and right in FIGS. 13A and 13B), and the measurement shaft 42a is moved left and right integrally with the measuring element 41. Following the left and right movement of the measurement shaft 42a, the slider 112 and the scale 129a of the moving amount detecting sensor 129 are integrally moved back and forth in the moving direction of the measurement shaft 42a. This back and forth moving direction and the moving amount are detected by the reading head 129b of the moving amount detecting sensor 129, and inputted to the arithmetic control circuit 80. Then, from output signals of the back and forth moving amount and direction thereof of the reading head 129b, the arithmetic control circuit 80 determines the moving positions of the measuring element 41 and the tip of the feeler 101 as an coordinate position from an initial position (measuring element reference position 300).

Then, the arithmetic control circuit 80 determines a coordinate position of the front refracting surface (left surface of the eyeglass lens in. FIG. 5) of the eyeglass lens ML at the lens shape information (θi, ρi) from the drive pulses of the base drive motor 14, the lens shaft drive motor 25, and the pulse motor 59, the detecting signals (detecting signals of the feeler moving amount) or the like from the reading head 129b, and then stores (records) the determined coordinate position in any one of the storage areas m1 to m8 of the data memory 82.

Similarly, the arithmetic control circuit 80 makes the other feeler 102 of the measuring element 41 abut the rear surface (rear refracting surface) of the eyeglass lens ML. The arithmetic control circuit 80 determines the coordinate position of the rear refracting surface (right surface of the eyeglass lens in FIG. 5) of the eyeglass lens ML corresponding to the lens shape information (θi, ρi), and stores (records) the determined coordinate position in any one of the storage areas m1 to m8 of the data memory 82.

In this case, when the other feeler 102 is abutted on the backside of the eyeglass lens ML, the measuring element 41 is moved in the left direction of FIG. 13, and the measurement shaft 42a is moved in the same direction integrally with the measuring element 41. Then, the slider 112 for holding the measurement shaft 42a is moved in the left direction of FIG. 13, and the plate 116 is moved in the same direction integrally with the slider 112. In such movements, the horizontal locking plate 116b of the plate 116 presses and displaces the locking plate 119a of the spring supporting plate 119 in the right direction of FIGS. 19 and 20. In this c the locking plate 120b of the reel attaching plate 120 is abutted on the stopper plate 126a of the bracket 126 fixed to the fixed table 106, and cannot be moved in the left direction of FIGS. 15A and 13B. Thus, the leaf spring 123 wound on the reel 121 is delivered from the reel 121 following the leftward movements of the reel attaching plate 120 and the reel 121, and the slider 112 as spring-pressed in the right direction of FIG. 13 via the lacking plate 119a and the horizontal locking plate 116b.

Subsequently, the arithmetic control circuit 80 determines the edge thickness by calculation from the determined coordinate positions of the front and rear refracting surfaces of the eyeglass lets ML for the lens shape information (θi, ρi).

(Retreating of Measuring Element 41)

After the end of the above-described measurement, the element 41 in the following manner as shown in FIGS. 11 to 16. That is, first, the arithmetic control circuit 80 controls the motion of the base drive motor 14 with the pulse motor driver 86, separates the eyeglass lens ML from the feelers 101 and 102 of the measuring element 41, and positions them in the center thereof. Then, the arithmetic control circuit 80 controls the operation of the pulse motor driver 86 to rotate the pulse motor 59 normally, and the screw shaft 58 reversely by the mules motor 59. The stage 60 is lowered along the guide rails 57 and 57 by the screw shaft 58, and the lens shaft holder 61 is lowered integrally with the stage 60. Thus, the carriage 22 is rotated downward around the carriage swing shaft 21, and the eyeglass lens ML between the lens shafts 23 and 24 is shifted from between the feelers 101 and 102 of the measuring element 41.

Subsequently, the arithmetic control circuit 80 controls the motion of the pulse motor 140 to transmit the rotation of the pulse motor 140 to the large-diameter gear 139 through the pinion 141, and rotary-drives the large-diameter gear 139 such that the light shielding plate 142 can be moved to the position detecting sensor 143 side. The light shielding plate 142 is moved between the light emitting elements 143a and 143b to shut off a light directed from the light emitting element 143a to the light emitting element 143b. When the position detecting sensor 143 detects the light shielding plate 142, this detecting signal is inputted to the arithmetic control circuit 80. Upon detection of the light shielding plate 142, the arithmetic control circuit 80 stops the motion of the pulse motor 140.

Such a rotation of the large-diameter gear 139 is transmitted through the rotation transmission shaft 135 to the attaching plate 132, and the attaching plate 132 is rotated from a position indicated by a two-dot chain line to a position indicated by a solid line in FIG. 17. By this rotation, the rotation regulating pin 133, the spring locking pin 134 and the measurement shaft 42a are rotated integrally with the attaching plate 132. The rotation regulating pin 133 is abutted on the stopper plate 116a, while the measuring element 41 is rotated to a stand-up retreated position shown in FIG. 5, and FIGS. 11 to 16.

(V-Groove Setting)

When the edge thickness Wi is determined in such a manner, the arithmetic control circuit 80 determines the V-groove position at the lens shape information (θi, ρi) of the eyeglass lens ML in a predetermined ratio and stores (records) the determined V-groove position in any one of the storage areas m1 to m8 of the data memory 82. Since the V-groove position can be determined by use of a known method, detailed description thereof will be omitted.

(Calculation of Processing Data)

After the V-groove setting, the arithmetic control circuit 80 determines the processing data (θi', ρi') of the eyeglass lens ML corresponding to the lens shape information (θi, ρi) from data such as a pupil distance PD based on a formula of the eyeglass lens and a frame geometrical center-to-center distance FPD, a raised amount or the like, and is stored in the processing data storage area 83a.

(Grinding)

After the calculation of the processing data, the arithmetic control circuit 80 controls the motion of the grinding wheel drive motor 30 with the motor driver 56*a* to control rotary-driving of the grinding wheel 35. The grinding wheel 35 includes the rough grinding wheel (flat grinding wheel), the grinding wheel for a V-groove, the finish grinding wheel or the like, as described above.

On the other hand, the arithmetic control circuit 80 controls the drive of the lens shaft drive motor 25 via the pulse motor driver 86 based on the processing data ($\theta i'$, $\rho i'$) stored in the processing data storage area 83*a* in order to control the rotation of the lens rotation shafts 23 and 24 and the eyeglass lens M1.

At this time, the arithmetic control circuit 80 first controls the motion of the pulse motor driver 86 at the position where i=0 based on the processing data ($\theta i'$, $\rho i'$) stored in the processing data storage area 83*a* in order to control the drive of the pulse moor 59. Accordingly, the screw shaft 58 is rotated reversely, and the stage 60 is lowered by a predetermined amount. With the lowering of the stage 60, the lens shaft holder 61 is integrally lowered with the stage 60 by the own weight of the carriage 22 and the spring force of the spring 54 in the processing pressure adjusting mechanism 45.

After the unprocessed circular eyeglass lens ML abuts the grinding surface 35*a* of the Jading wheel 35 by the own weight of the carriage 22 and the spring force of the spring 54 in the processing pressure adjusting mechanism 45, only the stage 60 is lowered. When the stage 60 is separated downward from the lens shaft holder 61 by such lowering, the separation is detected by the sensor S, and the detecting signals from the sensor S are inputted into the arithmetic control circuit 80. On receiving the detecting signal from the sensor S, the arithmetic control circuit 80 further controls the drive of the pulse motor 59 to slightly lower the stage 60 by the predetermined amount.

Accordingly, the eyeglass lens ML is ground with the grinding wheel 35 by the predetermined amount at the processing data ($\theta i'$, $\rho i'$) where i=0. When the lens shaft holder 61 is lowered with the grinding to abut the stage 60, the sensor S detects the abutment to output the detecting signals, and then the detecting signals are inputted into the arithmetic control circuit 80.

On receiving the detecting signals, the arithmetic control circuit 80 allows the eyeglass lens ML to be ground by the grinding wheel 35 in a manner that the case where i=1 of the processing data ($\theta i'$, $\rho i'$) is similar to that where i=0 thereof. The arithmetic control circuit 80 performs such control until i=n (360°), so that the circumferential edge of the eyeglass lens ML is ground by the rough grinding wheel (not given the reference numeral) of the grinding wheel 35 to be the radius vector $\rho i'$ for each angle $\theta i'$ of the processing data ($\theta i'$, $\rho i'$).

Moreover, the arithmetic control circuit 80 allows the circumferential part of the eyeglass lens ML ground roughly in a shape of the processing data ($\theta i'$, $\rho i'$) to be subjected to the V-groove processing by the grinding wheel for a V-groove (not given the reference numeral) of the grinding wheel 35.

As described above, the lens shape measuring apparatus according to the first aspect of the invention comprises: the lens fixing jig installed in a lens to be processed to clamp the lens; the lens rotation shaft for clamping and rotating the lens to be processed; the measuring element abutted on a refracting surface of the lens clamped by the lens rotation shaft; the measuring unit for measuring a moving distance of the measuring element; and the arithmetic control means for identifying a shape of the lens fixing jig based on the moving distance of the measuring element measured by the measuring unit. Thus, by using the measuring element also used for measuring the edge thickness shape, it is possible to identify the size or the like of the outer-diameter shape of the lens fixing jig.

The lens shape measuring apparatus according to the second aspect of the invention comprises: the lens fixing jig installed in a lens to be processed to clamp the lens; the lens rotation shaft for clamping and rotating the lens to be processed; the measuring element abutted on a refracting surface of the lens clamped by the lens rotation shaft; the measuring unit for measuring a moving distance of the measuring element in a direction roughly parallel to the lens rotation shaft; and the arithmetic control means for moving a tip of the measuring element relatively in the direction roughly parallel to the lens rotation shaft, measuring a distance from a measuring reference position of the measuring element to an abutting position of the same by the measuring unit, and identifying a shape of the lens fixing jig based on a result of the measurement. Thus, by using measuring element also used for measuring the lens shape, it is possible to identify the size of the outer-diameter shape of the lens fixing jig in the direction roughly parallel to the lens rotation shaft. Moreover, when the outer-diameter shape of the lens fixing jig is large, it is possible to prevent the destruction of the measuring element essential to a precise lens shape measurement by the clashing of the measuring element with the lens fixing jig.

The lens shape measuring apparatus according to the third aspect of the invention comprises: the lens fixing jig installed in a lens to be processed to clamp the lens; the lens rotation shaft for clamping and rotating the lens to be processed; the measuring element abutted on a refracting surface of the lens clamped by the lens rotation shaft; the measuring element rotating means for controlling rotation of the measuring element around a rotation shaft roughly parallel to the lens rotation shaft; the measuring unit for measuring a moving distance of the measuring element in a direction roughly parallel to the lens rotation shaft; and the arithmetic control means for rotating a tip of the measuring element around the lens rotation shaft, and identifying a shape of the lens fixing jig based on a distance of the abutted position of the tip of the measuring element from a measuring element reference position. Thus, it is possible to identify the size of the outer-diameter shape of the lens fling jig in the rotation shaft direction of the measuring element roughly parallel to the lens rotation shaft. Moreover, when the outer-diameter shape of the lens fixing jig is large, it is possible to prevent the destruction of the measuring element essential to a precise lens shape measurement by the clashing of the measuring element with the lens fixing jig.

Although the preferred embodiments of the invention have been described, it should be understood that various changes and modifications may be made to the aforementioned embodiments without departing the scope of the invention.

What is claimed is:

1. A lens shape measuring apparatus, comprising:
   a lens fixing jig installed in a lens to be processed to clamp the lens;
   a lens rotation shaft for clamping and rotating the lens to be processed;
   a measuring element having a feeler abutted on a refracting surface of the lens clamped by the lens rotation shaft;

a measuring unit for measuring a moving distance of the feeler of the measuring element; and arithmetic control means for measuring a shape of the lens and for identifying a shape of the lens fixing jig, wherein the arithmetic control means measures a size of an outer shape of the lens fixing jig based on both the moving distance of the measuring element and a signal from the measuring unit.

2. The lens shape measuring apparatus according to claim 1, wherein the lens rotation shaft is swung to be brought close to and to be separated from the measuring element.

3. The lens shape measuring apparatus according to claim 1, wherein the measuring unit includes a measuring element moving amount detecting mechanism.

4. The lens shape measuring apparatus according to claim 1, wherein the arithmetic control means controls the lens rotation shaft according to a measuring element moving amount detecting signal of the measuring unit.

5. The lens shave measuring apparatus according to claim 1, wherein the arithmetic control means rotates the feeler of the measuring element around the lens rotation shaft, and identifies the shape of the lens fixing jig based on a distance of an abutted position of the feeler of the measuring element from a measuring element reference position.

6. The lens shape measuring apparatus according to claim 1, wherein the arithmetic control means moves the feeler of the measuring element relatively in the direction roughly parallel to the lens rotation shaft, measures a distance from a measuring reference position of the measuring element to an abutting position of the same by the measuring unit, and identifies the shape of the lens fixing jig based on a result of the measurement.

7. A lens shape measuring apparatus, comprising:

a lens fixing jig installed in a lens to be processed to clamp the lens;

a lens rotation shaft for clamping and rotating the lens to be processed;

a measuring element abutted on a refracting surface of the lens clamped by the lens rotation shaft;

a measuring unit for measuring a moving distance of the measuring element in a direction roughly parallel to the lens rotation shaft; and arithmetic control means for moving a tip of the measuring element relatively in the direction roughly parallel to the lens rotation shaft, measuring a distance from a measuring reference position of the measuring element to an abutting position of the same by the measuring unit, and identifying a shape of the lens fixing jig based on a result of the measurement, wherein the arithmetic control means measures a size of an outer shape of the lens fixing jig.

8. A lens shape measuring apparatus, comprising:

a lens fixing jig installed in a lens to be processed to clamp the lens;

a lens rotation shaft for clamping and rotating the lens to be processed;

a measuring element having a feeler abutted on a refracting surface of the lens clamped by the lens rotation shaft;

a measuring unit for measuring a moving distance of the feeler of the measuring element; and arithmetic control means for identifying a shape of the lens fixing jig, wherein the arithmetic control means controls the feeler of the measuring element to move on the lens fixing jig such that the feeler is positioned above the lens fixing jig, controls the moving distance of the feeler of the measuring element such that the feeler is close to said lens fixing jig, and detects whether or not the feeler is abutted on a side face of the lens fixing jig and judges whether or not the lens fixing jig is large or small in diameter to identify the shape of the lens fixing jig.

* * * * *